(12) United States Patent
Falik et al.

(10) Patent No.: US 7,606,955 B1
(45) Date of Patent: Oct. 20, 2009

(54) SINGLE WIRE BUS FOR CONNECTING DEVICES AND METHODS OF OPERATING THE SAME

(75) Inventors: Ohad Falik, Kfar-Saba (IL); Victor Flachs, Rishioth Lezion (IL)

(73) Assignee: National Semiconductor Corporation, Santa Clara, CA (US)

( * ) Notice: Subject to any disclaimer, the term of this patent is extended or adjusted under 35 U.S.C. 154(b) by 455 days.

(21) Appl. No.: 10/931,933

(22) Filed: Sep. 1, 2004

Related U.S. Application Data

(60) Provisional application No. 60/505,241, filed on Sep. 23, 2003, provisional application No. 60/503,450, filed on Sep. 15, 2003, provisional application No. 60/503,713, filed on Sep. 15, 2003.

(51) Int. Cl.
*G06F 13/00* (2006.01)
*G06F 3/00* (2006.01)
*G06F 5/00* (2006.01)
*G06F 13/42* (2006.01)
*G06F 15/16* (2006.01)

(52) U.S. Cl. .................... 710/110; 710/58; 710/61; 710/105; 710/106; 709/230

(58) Field of Classification Search .................. 710/110, 710/117, 11, 58, 61, 105, 106; 709/230
See application file for complete search history.

(56) References Cited

U.S. PATENT DOCUMENTS

| | | | |
|---|---|---|---|
| 5,210,846 A | | 5/1993 | Lee |
| 5,235,685 A | * | 8/1993 | Caldara et al. ............ 710/313 |
| 5,237,322 A | * | 8/1993 | Heberle ................ 340/870.13 |
| 5,297,261 A | * | 3/1994 | Kuranaga ................ 710/104 |
| 5,459,751 A | * | 10/1995 | Okamoto ................. 375/354 |
| 5,636,342 A | | 6/1997 | Jeffries |
| 5,655,132 A | | 8/1997 | Watson |

(Continued)

FOREIGN PATENT DOCUMENTS

DE 19643013 C1 * 2/1998

(Continued)

OTHER PUBLICATIONS

"1-Wire Products Mixed-Signal Design Guide", 2005, Dallas Semiconductor, 4th Edition, retrieved from the Internet on Mar. 13, 2007 at http://www.maxim-ic.com/cgi-bin/dg?dg=1_WIRE_PRODUCTS.*

(Continued)

*Primary Examiner*—Khanh Dang
*Assistant Examiner*—Faisal M Zaman

(57) ABSTRACT

A master/slave system architecture that includes a single wire bus, a master device and bus interface coupled to the bus. The system further includes plurality of slave devices having respective bus interfaces coupled to the bus. Each of the slave devices having a designated device identification. There is further provided a communication protocol implemented over the single wire bus and employed by the master and the slave devices. The protocol includes bus transactions composed each of bit signals that belong each to a bit signal type from among a plurality of bit signal types. Each bit signal type has a time interval that is discernible from respective time intervals of all other bit signal types from among the plurality of bit signal types.

23 Claims, 15 Drawing Sheets

U.S. PATENT DOCUMENTS

| | | | | |
|---|---|---|---|---|
| 5,745,359 | A * | 4/1998 | Faulk | 363/95 |
| 5,758,282 | A | 5/1998 | Yamashina et al. | |
| 5,761,697 | A | 6/1998 | Curry et al. | |
| 5,809,518 | A * | 9/1998 | Lee | 711/115 |
| 5,831,849 | A * | 11/1998 | Matsui | 700/3 |
| 5,862,354 | A * | 1/1999 | Curiger et al. | 710/110 |
| 5,936,520 | A | 8/1999 | Luitje et al. | |
| 6,044,136 | A * | 3/2000 | Takahashi et al. | 379/93.23 |
| 6,108,751 | A | 8/2000 | Lee et al. | |
| 6,112,275 | A | 8/2000 | Curry et al. | |
| 6,219,789 | B1 * | 4/2001 | Little et al. | 726/34 |
| 6,239,732 | B1 * | 5/2001 | Cusey | 341/155 |
| 6,298,066 | B1 * | 10/2001 | Wettroth et al. | 370/449 |
| 6,363,066 | B1 * | 3/2002 | Frimodig | 370/360 |
| 6,363,439 | B1 * | 3/2002 | Battles et al. | 710/36 |
| 6,377,641 | B1 * | 4/2002 | Katayama et al. | 375/354 |
| 6,697,897 | B1 * | 2/2004 | Friel et al. | 710/105 |
| 6,941,451 | B2 | 9/2005 | Rudy et al. | |
| 7,099,970 | B1 * | 8/2006 | Foegelle et al. | 710/110 |
| 7,111,097 | B2 * | 9/2006 | Lin | 710/105 |
| 7,143,215 | B2 * | 11/2006 | Dunstan et al. | 710/104 |
| 7,181,557 | B1 | 2/2007 | Falik et al. | |
| 2003/0135622 | A1 * | 7/2003 | Anderson et al. | 709/227 |
| 2004/0208200 | A1 * | 10/2004 | Hejdeman et al. | 370/476 |
| 2004/0233917 | A1 * | 11/2004 | Rocas et al. | 370/395.62 |

FOREIGN PATENT DOCUMENTS

| | | | |
|---|---|---|---|
| DE | 10340806 | B3 * | 5/2005 |
| DE | 102005026988 | A1 * | 12/2006 |
| EP | 0278042 | A1 * | 8/1988 |
| EP | 1050826 | A1 * | 5/1999 |
| JP | 2000032067 | A * | 1/2000 |
| JP | 2000330934 | A * | 11/2000 |

OTHER PUBLICATIONS

"Book of iButton Standards: iButton™ Overview", Maxim IC/Dallas Semiconductor, Jan. 16, 2002, Application Note 937, pp. 1-8 and 74-76, retrieved from the Internet on Nov. 6, 2007 at http://www.maxim-ic.com/appnotes.cfm/appnote_number/937.*

"Book of iButton Standards: iButton Overview", Maxim IC/Dallas Semiconductor, Jan. 16, 2002, Application Note 937, entire document.*

Ghoneima et al., "Serial-Link Bus: A Low-Power On-Chip Bus Architecture", May 2005, IEEE Computer Society, Proceedings of the 2005 IEEE/ACM International Conference on Computer-Aided Design, pp. 541-546.*

Takahashi, T.; Muto, T.; Shirai, Y.; Shirotori, F.; Takada, Y.; Yamagiwa, A.; Nishida, A.; Kiyuna, T., "110 GB/s simultaneous bi-directional transceiver logic synchronized with a system clock," Solid-State Circuits Conference, 1999, Digest of Technical Papers. ISSCC. 1999 IEEE International , vol., no., pp. 176-177, 1999.*

Jongsun Kim; Bo-Cheng Lai; Chang, M.-C.F.; Verbauwhede, I., "A Cost-Effective Latency-Aware Memory Bus for Symmetric Multiprocessor Systems," Computers, IEEE Transactions on , vol. 57, No. 12, pp. 1714-1719, Dec. 2008.*

Gabriel, C.; Horia, H., "Integrating sensor devices in a LIN bus network," Electronics Technology: Integrated Management of Electronic Materials Production, 2003. 26th International Spring Seminar on , vol., no., pp. 150-153, May 8-11, 2003.*

* cited by examiner

*Optional: internal or external

| Address (xx xxxx$_2$) | Read | | Write | | Notes |
|---|---|---|---|---|---|
| | Name | Number of Bits | Name | Number of Bits | |
| 00 0000 | Device Number | 8 | - | - | |
| 00 0001 | Manufacturer ID | 16 | - | - | |
| 00 0010 | Device ID | 16 | - | - | |
| 00 0011 | Capabilities Fixed | 16 | - | - | |
| 00 0100 | Device Status | 8 | - | - | |
| 00 0101 | Device Control | 16 | Device Control$^{ii}$ | 16 | |
| 00 0110 | Capability Expansion | N.I.$^{iii}$, 8, 16, 24, 32$^{iv}$ | | - | Reserved for manufacturer-specific enhancements |
| 00 0111 | Reserved | - | Reserved | - | Reserved for future expansions of the specification |
| 00 1xxx | | Function 1 registers — 701 | | | Defined per device |
| 01 0xxx | | Function 2 registers — 702 | | | Defined per device |
| 01 1xxx | | Function 3 registers — 703 | | | Defined per device |
| 1x xxxx | | Reserved (32 addresses) — 704 | | | Reserved for manufacturer-specific functions and testing |

FIG. 7

| Address (xx xxxx₂) | Read | | Write | | Notes |
|---|---|---|---|---|---|
| | Name | Number of Bits | Name | Number of Bits | |
| 00 0000 | Device Number | 8 | Device Number | 8 | Allowed only while the device does not have an assigned address. |
| 00 0001 | Manufacturer ID | 16 | - | - | |
| 00 0010 | Device ID | 16 | - | - | |
| 00 0011 | Device S/N | 32 | - | - | |
| 00 0100 | - | - | - | - | |
| 00 0101 | - | - | Device Control | 16 | |
| Other | - | - | - | - | |

FIG. 10

| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| NAME | Capability Expansion Size | | | | FuncDescriptor 3 | | | | FuncDescriptor 2 | | | | FuncDescriptor 1 | | | |
| RESET | Device Dependent | | | | | | | | | | | | | | | |

| BIT | 7 | 6 | 5 | 4 | 3 | 2 | 1 | 0 |
|---|---|---|---|---|---|---|---|---|
| NAME | BER | ERF3 | EFR2 | EFR1 | Res | SF3 | SF2 | SF1 |
| RESET | 0 | 0 | 0 | 0 | 0 | 0 | 0 | 0 |

| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| NAME | Reserved for Manufacturer Expansion | | | | Reserved | | | | EnF3 | EnF3 | EnF3 | EnF3 | Res. | Low Pwr | Shut down | Reset |
| RESET | 0 | 0 | 0 | 0 | 0 | 0 | 0 | 0 | 0 | 0 | 0 | 0 | 0 | 0 | 0 | 0 |

⟵ 130, 132, 131

| Bit | Type | Description |
|---|---|---|
| 3-0 | RO | FuncDescriptor1 (Function 1 Type Descriptor). Defines the type of Function 1 in the device.<br>0000: Function is not available (the master should not access its registers).<br>0001: Temperature Measurement type.<br>0010: Voltage-Only Measurement type.<br>0011: Voltage Measurement with $V_{core}$ support.<br>0100: $E^2$ PROM type<br>1100-1111: Manufacturer-specific function types. Reserved for assignment by manufacturer.<br>other: Reserved for future expansions of the specification. |
| 7-4 | RO | FuncDescriptor2 (Function 2 Type Descriptor). Same as FuncDescriptor 1 for Function 2 of the device. |
| 11-8 | RO | FuncDescriptor3 (Function 3 Type Descriptor). Same as FuncDescriptor 1 for Function 3 of the device. |
| 15-12 | RO | CapabilityExpansionSize (Capability Expansion Size Value). Indicates the presence of Capability Expansion Register and defines its size. The structure of the field and its contents is manufacturer-specific.<br>0000: No Capability Expansion register available.<br>0001: Capability Expansion register is 1 byte (8 bits) long.<br>0010: Capability Expansion register is 2 byte (16 bits) long.<br>0011: Capability Expansion register is 3 byte (24 bits) long.<br>0100: Capability Expansion register is 4 byte (32 bits) long.<br>other: Reserved for future expansions of the specification. |

FIG. 11

| Bit | Type | Description |
|---|---|---|
| 0 | R/W | Reset (Reset Device). When set to "1" this bit initiates a Device Reset operation (see Error! Reference source not found.). This bit self-clears after the Device Reset operation is completed.<br>0: Normal device operation. (default)<br>1: Device Reset<br>Important Note: Devices should not mandate reset after power up. |
| 1 | R/W | Shutdown (Shutdown Mode). When set to "1" this bit stops the operation of all functions and places the device in the lowest power consumption mode.<br>0: Device in Active Mode. (default)<br>1: Device in Shutdown Mode. |
| 2 | R/W | LowPwr (Low-Power Mode). When set to "1" this bit slows the operation of all functions and places the device in a low power consumption mode. In Low-Power Mode, each enabled function behaves in the way described for the specific Function Type.<br>0: Device in Active Mode. (default)<br>1: Device in Low-Power Mode. |
| 3 | - | Reserved for future expansions of the specification. |
| 4 | R/W | EnF1 (Enable Function 1). When this bit is set to "1" Function 1 is enabled for operation. A function may require setup before this bit is set. The function registers can be accessed even when the function is disabled.<br>0: Function 1 is disabled. (default)<br>1: Function 1 is enabled. |
| 5 | R/W | EnF2 (Enable Function 2). Same as EnF1 for Function 2. |
| 6 | R/W | EnF3 (Enable Function 3). Same as EnF1 for Function 3. |
| 11-7 | - | Reserved for future expansions of the specification. |
| 15-12 | R/W | Reserved for manufacturer-specific enhancements. |

FIG. 14

| Offset | Read | | Write | | Notes |
|---|---|---|---|---|---|
| | Name | Number of bits | Name | Number of bits | |
| 000b | Capabilities | 16 | - | - | |
| 001b | Data Readout | 16 or 24 | - | - | The number of bits is defined in the Capabilities register |
| 010b | Control | 16 | Control | 16 | |
| 011b | Status | 8 | - | - | |
| 100b | PROCHOT Read | 16 | PROCHOT Select | 8 | Bits 0-1 are common to PROCHOT Read and PROCHOT Select registers |
| 101b | PROCHOT Control | 8 | PROCHOT Control | 8 | |
| 110b | Force PROCHOT | 16 | Force PROCHOT | 16 | |
| Other | Reserved | - | Reserved | - | Reserved for future expansions of the specification |

FIG. 15

| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| NAME | Res. | VR_HOT | PROCHOT Plus | | Number of sensors | | | Int Sens Size | Rout Size | Sign | Number of Bits | | | | Resolution | |
| RESET | 0 | 0 | | | Device Dependent | | | | | | | | | | | |

| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| NAME | | | | | Temperature Readout | | | | | | | SNUM | | | EF | SEF |
| RESET | X | X | X | X | X | X | X | X | X | X | X | X | X | X | X | X |

FIG. 17A

| BIT | 23 | 22 | 21 | 20 | 19 | 18 | 17 | 16 | 15 | 14 | 13 | 12 | 11 | 10 | 9 | 8 |
|---|---|---|---|---|---|---|---|---|---|---|---|---|---|---|---|---|
| NAME | | | | | | | Temperature Readout | | | | | | | | | |
| RESET | X | X | X | X | X | X | X | X | X | X | X | X | X | X | X | X |

| BIT | 7 | 6 | 5 | 4 | 3 | 2 | 1 | 0 |
|---|---|---|---|---|---|---|---|---|
| NAME | Reserved | | | SNUM | | | EF | SEF |
| RESET | 0 | 0 | 0 | X | X | X | X | X |

| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| NAME | Reserved | | | | | | | | EN6 | EN5 | EN4 | EN3 | EN2 | EN01 | EN0 | ATE |
| RESET | 0 | 0 | 0 | 0 | 0 | 0 | 0 | 0 | X | X | X | X | X | X | X | X |

| BIT | 7 | 6 | 5 | 4 | 3 | 2 | 1 | 0 |
|---|---|---|---|---|---|---|---|---|
| NAME | Reserved | | | | | | PROCHOT_Select | |
| RESET | 0 | 0 | 0 | 0 | 0 | 0 | X | |

— 190

| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| NAME | | | PROCHOT Active | | | | | | PA_Valid | Reserved | | | | VRH_STS | PROCHOT_Select | |
| RESET | X | X | X | X | X | X | X | X | X | 0 | 0 | 0 | 0 | X | X | X |

— 200

SINGLE WIRE BUS FOR CONNECTING DEVICES AND METHODS OF OPERATING THE SAME

CROSS-REFERENCE TO RELATED APPLICATIONS

This application claims the benefit of priority under 35 U.S.C. §119(e)(1) of provisional application Ser. No. 60/503,450 filed Sep. 15, 2003, and provisional application Ser. No. 60/503,713 filed on Sep. 15, 2003 and provisional application Ser. No. 60/505,241 filed Sep. 23, 2003 and are incorporated herein by reference for all purposes.

The present invention is related to the invention disclosed in U.S. patent application Ser. No. 10/929,734, filed on Aug. 30, 2004, entitled "SYSTEM FOR REGULATING USAGE IN A BUS-MASTER CONTROLLED BUS SYSTEM AND METHOD OF OPERATING THE SAME."

FIELD OF THE INVENTION

This invention relates to Single Wire Bus for Connecting Devices in a system, such as PC system and to Master Slave Operational Interface (MSOI) for communicating between devices.

BACKGROUND OF THE INVENTION

U.S. Pat. No. 5,936,520, an Analog Sensor Status Detection Single Wire Bus Multiplex System (Luitje, et al) discloses a circuit that monitors both digital and analog sensor readings by polling them from a single wire bus multiplex system. The circuit operates to sequentially address a plurality of smart sensor interfaces, each having an associated sensor, connected to the single wire bus. A voltage signal is supplied on the line that produces a current corresponding to the presence of a sensor at the polled interface and a current corresponding to a sensed digital or analog value where the sensor is of the digital or analog type, respectively. The currents on the bus are copied in a current mirror whose current output is applied to a resistor to produce a voltage, which in turn is converted into a digital number to be analyzed to determine the presence of a sensor at the addressed interface and its status. The current in the circuit is also measured to produce a voltage corresponding to circuit component variations and one corresponding to the contributions of the currents from the power supplies of the interfaces. These voltages correct the calculation of the voltage corresponding to the sensor analog value.

U.S. Pat. No. 5,636,342, Systems and Method for Assigning Unique Addresses to Agents on a System Management Bus, (Jeffries), discloses a system and method for automatically assigning addresses to agents on a system management bus in a computer system without requiring user intervention, i.e., without requiring the user to manually or programmatically set physical or logical switches. The computer system includes a system management bus which preferably uses the I.sup.2 C serial protocol. The bus includes at least one SMB master and a plurality of slaves for performing desired monitoring and control functions in the computer system. According to the present invention, the SMB master assigns unique addresses to each of the SMB slaves automatically and without user intervention. This provides a simpler, more efficient, and less error prone method for assigning addresses to SMB agents. In addition, the system of the present invention automatically assigns unique addresses to new devices inserted on the bus while the bus is operating and thus allows for hot pluggable devices.

U.S. Pat. No. 6,532,506, Communicating With Devices Over a Bus and Negotiating the Transfer Rate Over the Same, (Dunstan, et al.), discloses a system having a first device and a second device coupled to a single wire bus. The second device is operable to receive power from the single wire bus that is due to the first device driving the bus. The second device also communicates with the first device using the single wire bus.

U.S. Pat. No. 6,298,066, Single Wire Bus Interface for Multidrop Applications, (Wettroth, et al.), enables data communications between multiple devices over a single wire bus. This single-wire interface can be used for sensors, amplifiers, analog-to-digital converters (ADCs), or any other circuit which would normally have an electrical output. Advantages of the present invention include a reduction in device pin count, conservation of the limited number of I/O pins on the control device, and reduced board layout complexity. Speaking generally, each slave device coupled to the single wire bus interface is assigned a different response time window. This enables multiple slave devices to respond to an initial trigger signal generated by the master device without overlapping responses being generated on the single wire bus interface. A suitable slave electrical device includes application circuitry providing state information for the electrical device, an input/output pin suitable for making an electrical coupling external to the electrical device, and a single wire bus interface coupled to the input/output pin and the application circuitry. The single wire bus interface has conversion function circuitry defining a specific response time window for the electronic device. Further, the single wire bus interface is responsive to a start signal received on the input/output pin to generate a response signal within the specific response time window, the response signal indicative of the state information for the electrical device.

U.S. Pat. No. 5,809,518, Command/Data Transfer Protocol for One-Wire-Bus Architecture, (Lee), discloses a command protocol for a single wire bus for transmitting and receiving commands and data. The command protocol includes a serial command word which facilitates communication between a host circuit and a slave circuit. The serial command word is divided into portions which can be used to reset the slave circuit, request the slave circuit to identify itself, and to specify the type of data transfer that is to occur between the host circuit and the slave circuit.

U.S. Pat. No. 6,108,751, Single Wire Data Communication Method, (Lee, et al) discloses a system architecture which provides efficient data communication, over a one-wire bus, with a portable data module which does not necessarily include any accurate time base whatsoever. The time base in the module can be extremely crude (e.g. more than 4:1 uncertainty). An open-collector architecture is used, with electrical relations defined to absolutely minimize the drain on the portable module's battery. The protocol has been specified so that the module never sources current to the data line, but only sinks current. The protocol includes signals for read; write-zero; write-one; and reset. Each one-bit transaction is initiated by a falling edge from the host. The time base in the module defines a delay, after which (in write mode) the module tests the data state of the data line. In read mode, after a falling edge the module does or does not turn on its pull-down transistor, depending on the data value. Thus, the host system, after the falling edge, attempts to pull the data line high again, and then tests the potential of the data line to ascertain the data value.

U.S. Pat. No. 6,112,275, Method of Communicating Over a Single Wire Bus Between a Host Device and a Module Device Which Measures Thermal Accumulation Over Time, (Curry, et al.), discloses a method of communicating information between a host device and a potentially portable module device which measures thermal accumulation over time via a temperature controlled counter. The temperature controlled counter may operate using substantially Arrhenius' law. The host device communicates with the portable module via a single wire bidirectional data bus. The single wire bus and one-wire communication protocol allows data flow between a host and a plurality of devices connected to the single wire bus. The single wire bus allows for a great versatility of uses for the portable module.

U.S. Pat. No. 5,210,846, One-Wire Bus Architecture, (Lee), discloses a system architecture which provides efficient data communication, over a one-wire bus, with a portable data module which does not necessarily include any accurate time delay circuit whatsoever. The time delay circuit in the module can be extremely crude. An open-collector architecture is used, with electrical relations defined to absolutely minimize the drain on the portable module's battery. A protocol has been specified so that the module never sources current to a data line of the one-wire bus, but only sinks current. The protocol includes signals for read; write-zero; write-one; and reset. Each one-bit transaction is initiated by a falling edge of a voltage signal from the host. The time delay circuit in the module defines a delay, after which (in write mode) the module tests the data state of the data line. In read mode, after a falling edge of a voltage signal from the host the module does or does not turn on a pull-down transistor, depending on the value of the bit read. Thus, the host system, after the falling edge, attempts to pull the data line high again, and then tests the potential of the data line to ascertain the value of the bit read.

U.S. Pat. No. 5,761,697, Identifiable Modules on a Serial Bus System and Corresponding Identification Methods (Curry, et al.), discloses a single wire data bus that is utilized by a bus master to communicate with and identify electronic devices also connected to the single wire data bus. Each of the electronic devices include a unique ID (identification), wherein the bus master, using a one-wire protocol, can identify all of the electronic devices connected to the single wire data bus.

U.S. Pat. No. 6,239,732, One-Wire Device With a-to-D Converter (Cusey), discloses a low power integrated circuit having analog to digital conversion circuitry capable of receiving a plurality of analog signals and converting them to a digital value. The digital value is then transmitted, upon request, over a single wire bus. The accuracy of the analog to digital conversion circuitry can be calibrated via trim codes stored in an onboard EPROM.

BRIEF DESCRIPTION OF THE DRAWINGS

In order to understand the invention and to see how it may be carried out in practice, a preferred embodiment will now be described, by way of non-limiting example only, with reference to the accompanying drawings, in which like reference numerals represent like parts:

FIG. 7 illustrates a table of registers in a slave device, forming part of an Master Slave Operational Interface (MSOI), in accordance with an embodiment of the invention;

FIG. 10 illustrates the structure of a capability register, in accordance with an embodiment of the invention;

FIG. 11 illustrates functions descriptor table for the capability register, in accordance with an embodiment of the invention;

FIG. 12 illustrates the structure of a status register, in accordance with an embodiment of the invention;

FIG. 13 illustrates the structure of a control register, in accordance with an embodiment of the invention;

FIG. 14 illustrates functions descriptor table for the control register, in accordance with an embodiment of the invention;

FIG. 15 illustrates temperature measurement function address map, in accordance with an embodiment of the invention;

FIG. 16 illustrates the structure of a temperature measurement capability register, in accordance with an embodiment of the invention;

FIGS. 17A-B illustrate the structure of a temperature measurement readout register(s), in accordance with an embodiment of the invention;

FIG. 18 illustrates the structure of a temperature measurement control register, in accordance with an embodiment of the invention;

DETAILED DESCRIPTION OF THE INVENTION

Figure 1:
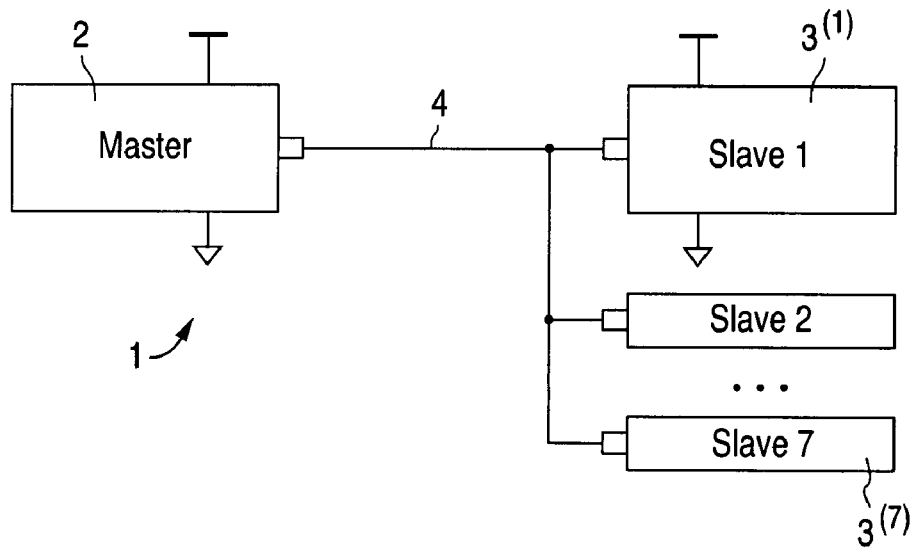
FIG. 1 illustrates a generalized system architecture in accordance with an embodiment of the invention.

FIGS. 1 through 22, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged single wire bus for connecting devices.

By one embodiment of the invention there is provided a Single-Wire Bus (e.g for computing system such as PC system) [SWPCBus] based on a single wire connection. The SWPCBus targets low-bandwidth, cost-effective communication with various devices such as sensors and other devices on the PC motherboard and daughter cards. The bus allows a single master device to communicate with plurality of slave devices using single communication line in a PC system. By one embodiment there is provided a communication protocol implemented over the single wire bus between the master and the slave devices. By one embodiment the protocol implements the following bit signal types: read, write, attention request, reset in a master to a specific slave or master to all slaves (broadcast) modes. Note that the invention in accordance with this aspect is not bound to PC system. According to one embodiment of the present invention, a master/slave system architecture is provided having a single wire bus, a master device (including a bus interface coupled to the bus), and at least one slave device having respective bus interfaces coupled to the bus. The present invention employs a communication protocol implemented over the single wire bus and employed by the master and at least one slave device. The protocol includes bus transactions composed each of bit signals that belong each to a bit signal type from among a plurality of bit signal types, each bit signal type has a time interval that is discernible from respective time intervals of all other bit signal types from among the plurality of bit signal types.

In a related embodiment, the invention further provides a master/slave system architecture comprising a single wire bus, a master device and bus interface coupled to the bus, and at least one slave device having respective bus interfaces coupled to the bus. The invention employs a communication protocol implemented over the single wire bus and employed by the master and at least one of the slave devices, the protocol includes bus transactions composed each of bit signals that belong each to a bit signal type from among a plurality of bit signal types, a bit signal of any given bit signal type is discernible with respect to any other bit signal of different bit signal type substantially irrespective of the noises superimposed on the bit signal.

In a related embodiment, the invention further provides a method for performing communication over a single wire bus between a master device and at least one slave device coupled through respective bus interfaces to the bus, comprising (i) providing a communication protocol implemented over the single wire bus and employed by the master and at least one slave device, (ii) the master driving bus transactions composed each of plurality of bit signals that belong each to a bit signal type from among a plurality of bit signal types, each bit signal type has a time interval that is discernible from respective time intervals of all other bit signal types from among the plurality of bit signal types.

The invention further provides a master device configured to communicate with at least one slave device over a single wire bus, the master device employing a communication protocol implemented over the single wire bus, the protocol includes bus transactions composed each of bit signals that belong each to a bit signal type from among a plurality of bit signal types, and each bit signal type has a time interval that is discernible from respective time intervals of all other bit signal types from among the plurality of bit signal types.

In a related embodiment, the invention further provides a slave device configured to communicate with a master device over a single wire bus. The slave device employing a communication protocol implemented over the single wire bus wherein he protocol includes bus transactions composed each of bit signals that belong each to a bit signal type from among a plurality of bit signal types. Each bit signal type has a time interval that is discernible from respective time intervals of all other bit signal types from among the plurality of bit signal types.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "apparatus", and "controller" may be used interchangeably and mean any device, system or part thereof that controls at least one operation, such a device may be implemented in hardware, firmware or software, or some combination of at least two of the same. It should be noted that the functionality associated with any particular apparatus or controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Attention is first drawn to FIG. 1 illustrating a generalized system (1) architecture (referred to also as a Single-Wire PC Bus (SWPCBus)) in accordance with an embodiment of the invention. Note that the invention is not bound to PC application. By this embodiment a master device (2) communicates with a plurality of slave devices $3^1$ to $3^7$ through a single communication line. Note that whilst in the embodiment of FIG. 1 there are shown 7 slave devices, the invention is, of course, not bound by this specific number of slave devices and, depending upon the particular application, more or less slave devices may be utilized. In this connection note that the appropriate field in the bus transaction (which will be discussed in greater detail below) that identifies the addressed slave naturally supports the number of slave devices. By way of non-limiting example, a 3-bit field can support up to 7 slaves and possibly another combination for broadcast mode (i.e. addressing message(s) to all the slaves).

Note that by an embodiment of the invention there is provided a compound system that employs few segments, each of the kind described with reference to the FIG. 1, or variants thereof.

Figure 2A:
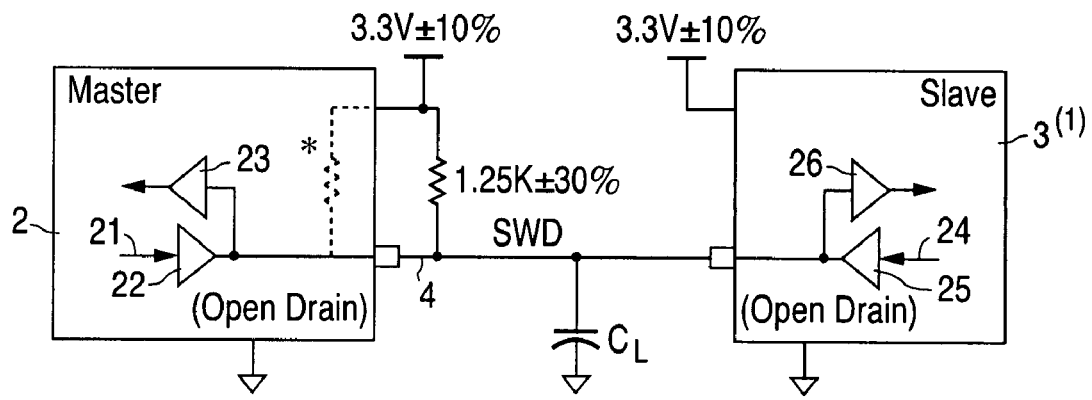
FIG. 2A illustrates a generalized master/slave architecture in accordance with an embodiment of the invention.

Attention is now drawn to FIG. 2A illustrating a generalized master/slave architecture in accordance with an embodiment of the invention. In the embodiment of FIG. 2 there is shown a bus interface of the master device (2) implemented by this example using in an open drain output buffer and an input buffer. There is further shown a single slave device (say device $3^1$) whose bus interface is implemented by this example using an open drain output buffer and an input buffer. Note that the invention is not bound by the open drain architecture and not by the specific bus interface described herein. Another non limiting example (instead of open drain) is a Wired OR. Reverting now to FIG. 2A, by this embodiment the input (21) to the master device (2) is fed to input/output buffer (22) and the single bus wire (4) level is sampled by means of input buffer (23). Similarly the input (24) to the slave device (31) is fed to output buffer (25) and the single bus wire (4) level is monitored by means of input buffer (26). Note that monitoring may include sampling. Note that whenever reference is made to sampling, it should be construed as one form of monitoring. By this embodiment, the bus uses 3.3V single-ended signaling, with a pull-up resistor and open-drain low-side drive. For timing purposes, the bus is designed for capacitive loads ($C_L$) of up to 400 pF. The slaves and master use the same supply rail. In certain embodiments a 3.3V standby rail ($V_{SB3}$) of the PC will be used as power supply for both the slave device (e.g. sensor) and the master device.

By one embodiment, it is possible to work with devices that are connected to other supply levels as long as the devices are tolerable to the voltage applied by the pull-up resistor and are capable of discriminating between the low voltage on the bus ("0") and other the pulled up value. It is further possible to use devices with different supply levels that are not tolerable to the voltage supplied by the pull up resistor as long as a voltage limiting circuit is placed between the bus segment that use a high voltage and the sensitive devices (example of such circuit for SMBus signals can be found in devices such as National Semiconductor PC87372). In addition, devices may be connected to supplies that are active at different times, in such a case, devices should be latch-up and back drive protected from the SWD (i.e., should not be damaged from a voltage on the bus while the device is not powered and should not load the bus when the device is not powered) and generate a reset bit signal on the single wire bus after being powered and being ready to connect to operate on the bus. Accordingly, this embodiment illustrates in a non limiting manner a scenario in which the slave devices and/or the master use a different supply rail than that of the bus.

Figure 2B:
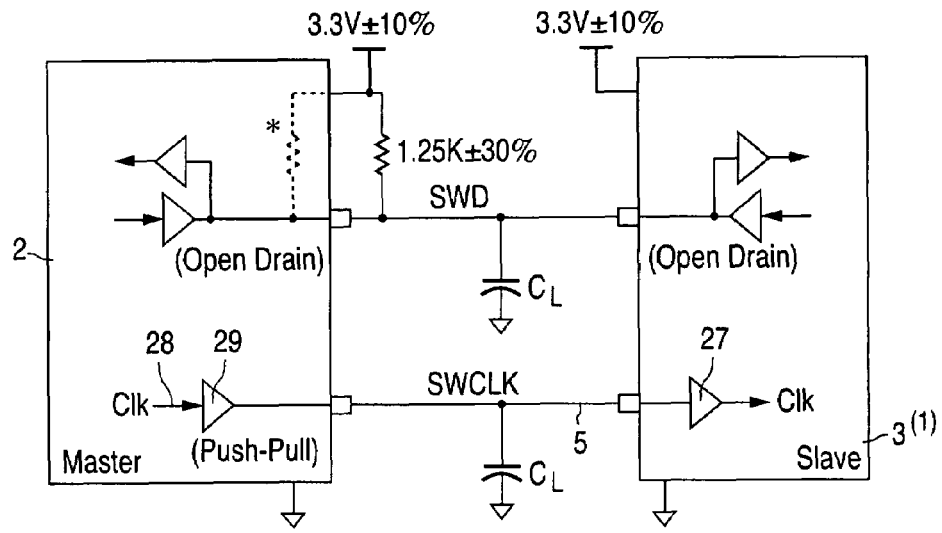
FIG. 2B illustrates a generalized master/slave architecture in accordance with another embodiment of the invention.

As will be explained in greater detail below, the embodiment of FIG. 2A is configured to operate in an a-synchronous mode of operation. Attention is now drawn to FIG. 2B illustrating a generalized master/slave architecture in accordance with another embodiment of the invention. The embodiment of FIG. 2B is substantially identical to that of FIG. 2A, except for the fact that is configured to operate in synchronous mode of operation. To this end a clock 28 used as reference for the data signal timing is fed to output buffer 29 in the master device 2 and is communicated through communication line 5 and input buffer 27 to all slaves operating in this mode such as the slave device 3[1]. The clock output buffer (29) is the only driver of the clock signal 5 and, accordingly, a push-pull output buffer can be used. However, other types of output buffers (e.g., open drain) may be used as well. The operation of the SWPCBus in synchronous mode of operation will be described in greater detail below.

By one embodiment, the protocol for communicating through the single line implements the following signals: read, write, reset and attention request in a master to a specific slave or master to all slaves (broadcast) modes and in a-synchronous or synchronous modes of operation. By this embodiment, the SWPCBus uses timing information to provide five types of bit signals over the bus:

Data Bit 0
Data Bit 1
Start Bit
Attention Request
Reset

All the bit signals involve driving the bus (e.g. 4 in FIG. 1) to a low level. The duration of the low level differentiates between the bit signals. The bus being at high level is used as a separator between the bit signals. Note that the terms single wire bus and single communication line are used interchangeably.

In a-synchronous mode, the bit signal time has a fixed range or value. As will be explained below, The reset sequence allows the slave device to adjust it's internal time-base (e.g., clock), basically, giving it a time reference for its operation in case it does not have one already.

The Synchronous mode enables the use of a master or devices with a reference clock which is not stable enough, or a bit banging implementation of a master on a processor core, or combination of them.

Note that the timing diagrams for the different types of bit signal on the single wire bus are drawn together to better highlight the timing relations between them. However, the different types of bit signal appear on the bus at different points in time.

Figure 3A:
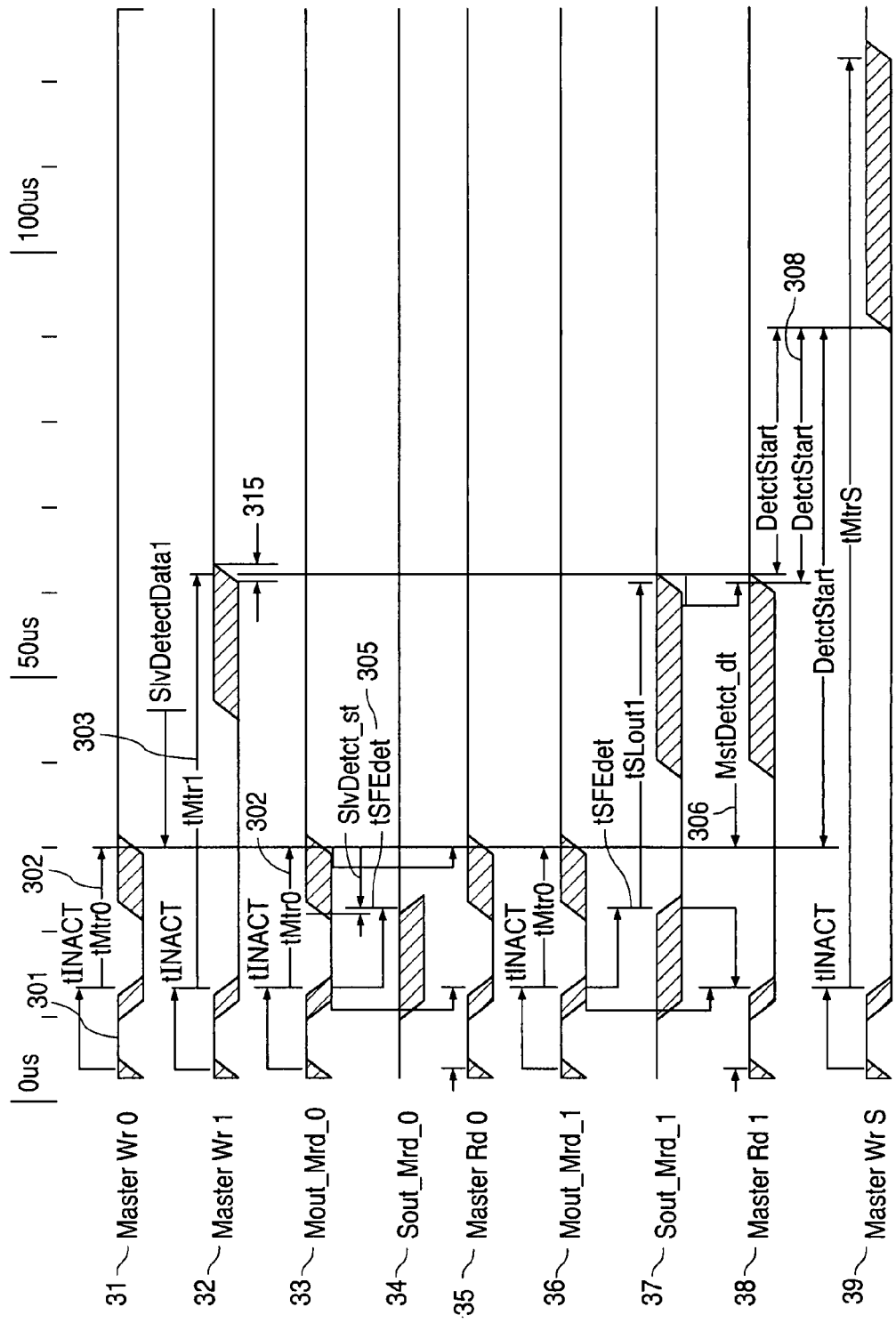
FIG. 3A illustrates a timing chart of various system signals, in accordance with an embodiment of the invention.

Bearing this in mind, attention is drawn to FIG. 3A, illustrating a timing chart of various bit signal types in accordance with an embodiment of the invention. Note that by this embodiment the bit signal types are basically classified into one out of two categories. The first category includes bit signals that are always driven by one source (normally the master). The other category includes bit signal types that are (or can be) a combination of both master and slave operations. Note that for clarity signals that fall in the second category are drawn in two parts. The first Mout_XXXX is the output of the master the Sout_XXX is the output of the slave and the third is what appears on the bus (which is the wired AND of both outputs).

The chart illustrates:

Master Wr 0 (31)—standing for Master, e.g. 2 of FIG. 1, writing the bit value "0". The bit "0" is read by one or more of the slaves;

Master Wr 1 (32)—standing for Master, e.g. 2 of FIG. 1, writing the bit value "1". The bit "1" is read by one or more of the slaves;

Mout_Mrd_0 (33)—standing for Master, e.g. 2 of FIG. 1, requesting to read a bit from the slave;

Sout_Mrd_0 (34)—standing for Slave, e.g. 3[1] of FIG. 1, in response to the Master request Mout_Mrd_0 (33) the slave will need to identify the bit read operation and avoid driving the bus to indicate that the bit being read is a "0";

Master Rd 0 (35)—standing for Master, e.g. 2 of FIG. 1, reading the bit value "0"; Note that the signal 35 is in fact the outcome of a "wired AND" operator that is applied to the Mout_Mrd_0 (33) and Sout_Mrd_0 (34);

Mout_Mrd_1 (36)—standing for Master, e.g. 2 of FIG. 1, requesting to read a bit from the slave;

Sout_Mrd_1 (37)—standing for Slave, e.g. 3[1] of FIG. 1, in response to the Master request of a bit read Mout_Mrd_1 (36) the slave output the data of '1' by driving the bus low;

Master Rd 1 (38)—standing for Master, e.g. 2 of FIG. 1, reading the bit value "1"; Note that the signal 38 is in fact the outcome of a "wired AND" operator that is applied to the Mout_Mrd_1 (36) and Sout_Mrd_0 (37);

Master Wr S (39)—standing for Start signal, which is discussed in greater detail below.

Note, that by this embodiment, that any signal starts with a so called "Bus Inactive" where the signal is high for a time interval of at least tINACT 301. Note that tINACT needs to be long enough to be detected by both master and slave. Considerations on the value of tINACT 301 are similar to those used for tSFEdet 305 that are discussed below.

In order to write "0" or "1" (by the master) the signal must be initiated by the Master (after the tINACT period has been elapsed). Generally speaking, the duration (time interval range) of the low level discerns between the various signal types. Thus, a data Bit 0 is indicated by a 'short' "0" pulse (for a time duration of tMtr0 302) and a Data Bit 1 is indicated by a longer pulse (for a time duration of tMtr1 303). Note that in connection with signal level, the terms "0" and low are interchangeable and, likewise, the terms "1" and high are interchangeable.

The difference in the range duration of the 'short' pulse and the long pulse should be enough for the slave to be able do discriminate between them.

During the bus inactive period (SWD is "1"), both master and slave are monitoring the bus and after the signal is "1" for at least tINACT both have bean assumed to detect this condition and be ready for the beginning of a new bit signal on the single wire bus. A master write of a bit starts with a drive of the signal to "0" for the period of 'tMtr0 or tMtr1 depending on the data value to be written. The slave must detect the falling edge of the signal within tSFEdet (305) to guarantee that it will be able to differentiate between the different data values. After the tMtr0 or tMtr1 elapses, the master release the bus and allows the signal to change to "1". The timing of the rising edge of the signal indicates which data bit is sent by the master, this needs to be monitored and detected by the slave. Note that in some conditions to be discussed below, the signal may remain low for a longer period past the release by the master, these cases must be monitored by the master and slave and handled.

By this embodiment, the slave must detect the master bit-signal active state within a pre-defined period after it is asserted and must start measuring the duration of the signal being active in order to detect the data value (as will be explained, with reference to tSFEdet (305), in greater detail below). Having described Master write of "0" or "1" there follows a brief overview of Master read "0" or "1". Thus, the master initiates (33 Mout_Mrd_0) a data read ("0") by driving the bus to a low level for a period of tMtr0 302 (after the tINACT period 301 has been elapsed). The slave must detect that the signal becomes active within a period tSFEdet 305. For a data read of '0', the slave is not required to drive the bus (Sout_Mrd_0 34), i.e. the signal (21 in FIG. 2A) is maintained at high level "1". The master Mout_Mrd_0 33 and the slave Sout_Mrd_0 34 are subject to "wired And" over the communication line (4 of FIG. 1), resulting in a Master Rd 0 signal 35 signifying that a Slave wrote "0" and the master reads the "0" (through buffer 23 of FIG. 2A).

Similarly, the Wired And of Mout_Mrd_1 (36) and S_out_Mrd_1 (37) give rise to the Master Rd 1 signal 38 signifying that a Slave wrote "1" and the master reads the "1" (through buffer 23 of FIG. 2A). Note that Master Rd 1 signal 38 is discernible from the Master Rd 0 35 signal type in that the former is a longer pulse (by a time interval of MsDetct_dt 306) than the latter (enabling thus the Master to identify the "long" pulse as "read 1" and the short pulse as "read 0").

For a data read of '1' the slave starts within tSFEdet to drive the bus low for a period of tSLout1. The master monitors the time at which the bus becomes inactive to identify a data read of '0' or '1'. Both master and slave monitor the bus to identify overriding conditions such as Attention Request.

Turning now to the Start signal 39, when it is initiated by the master (after tINACT time interval 301 has been elapsed), it indicates to the slave the beginning of a transfer. Slaves must monitor for Start bits at all time, to allow synchronization with the master transactions. If a Start Bit occurs in the middle of a transaction, the slave being addressed must use it as an error indication to abort the current transaction. In this case the transaction is not "completed" by the slave. The aborted transaction is handled as a transfer error. By one embodiment, an error is flagged in the status register (discussed in greater detail below) and the data written is ignored, and if it is a read it has no impact on 'valid' bits.

Note that the start bit signal type is discernible from the data read and write signals in that it is a longer signal (by a time interval of Detect Start 308). It is also different from attention request and reset (discussed in greater detail below) by being shorter.

During each Data Bit, both the master and all the slaves must monitor the bus (the master for Attention Request and Reset; the slaves for Start Bit, Attention Request and Reset) by measuring the time that the signal is active (low). If a Start Bit, Attention Requests or Reset condition is detected, the current "bit signal" is not treated as a Data Bit. In other words, a start, an attention request and a reset take precedence (i.e. being of higher priority type) over 'data bit', meaning that during the data transfer the master and slave must handle these prioritized signal types and ignore competing data bit signal types.

Figure 3B:
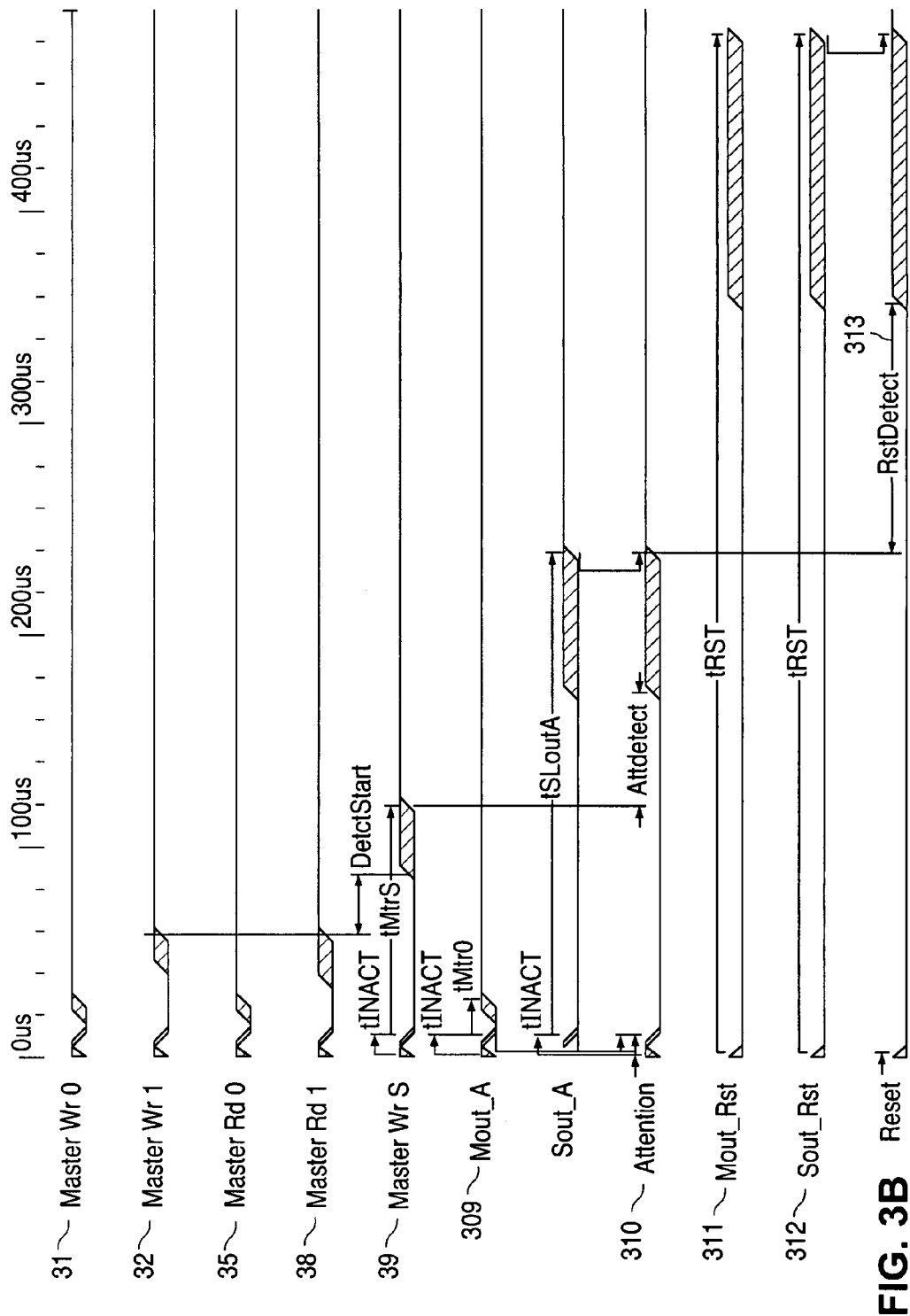
FIG. 3B illustrates a timing chart of additional various system signals, in accordance with an embodiment of the invention.

Turning now to FIG. 3B, there are shown the bit signals discussed with reference to FIG. 3A (bearing identical reference numerals and additionally the attention request signal 310.

The attention request is initiated normally by a slave or slaves. It signifies to the master that the slave has information for the master. A slave may initiate an Attention Request 310 when the SWPCBus is inactive, i.e. when the signal level is high for at least during the tINACT period (see 301 in FIG. 3A).

By this embodiment, in response to an attention request signal, the master reads the 'Device Status register' (discussed in greater detail below) of all slaves and handle any status bit that was set in the device at the time of the read. This guarantees the master handling of all event, all as discussed in greater detail below.

Note that a Data Bit, or Start Bit, from the master may start simultaneously with an Attention Request from a slave. In other words, the slave monitors the bus, senses "high" level (during the tINACT time interval that is guaranteed between data bits) and commences the attention request signal 310. In a certain operational scenarios the master may (substantially simultaneously) trigger a Data bit (say, signals 31, 32) or a start bit 39, thereby generating a collision). This is resolved by monitoring the signal time interval. Thus, since the attention request signal is a longer pulse (and can be measured independently by the master and the slave), it is determined unequivocally that an attention request signal has been transmitted. Once attention request is recorded, it will be handled later as part of the master operation sequence.

The fact that the parties attend the attention request signal and "ignore" the other signal (say, the data bit and/or start bit) is in agreement with the implicit assumption that the attention request signal has higher priority compared to the data bit signals.

If two slaves (say, $3^1$ and $3^7$) start an Attention Request simultaneously (i.e., within the tSFdet window) this is seen on the bus as one Attention Request. No data loss occurs in this sense since it is guaranteed that the Device Status register (discussed in greater detail below) of all slaves will be read after an attention request was detected on the bus.

Note that the so ignored signal (say the write data bit signal originated by the master that was discarded due to the collision with the attention request signal originated from the slave) is marked as such by both master and slave from the current transfer sequence. The master will continue the transfer sequence by repeating the ignored bit signal after the attention request bit-signal is completed. The effect of the attention request on the bus performance is substantially limited to the time of presence of the attention bit signal on the bus (i.e., no additional overhead is induced on any on going transaction.

By this embodiment, a slave must check that the bus is inactive for a time indicated by tINACT before starting an Attention Request, or and start the Attention Request within the tSFEdet time after signal becomes active.

After attention request both master and slave must monitor the bus in order to make sure that the "low" level is not maintained for a longer duration in which case a Reset signal (and not attention request signal) is encountered.

Note that by this embodiment, after Reset signal (as will be explained in greater detail below in the context of reset transaction with reference to FIG. 6), an Attention Request can not be sent before the master has sent 14 Data Bits on the bus. The 14 bits enables a training sequence to the time base. Even though the training sequence is shorter than 14 bit, an Attention Request is prohibited for a longer duration, to provide a guard band, i.e. the attention request is prohibited longer than reset sequence and shorter than the concatenation of Reset transaction+the shortest read/write transaction. The invention is, of course, not bound by this specific example of training sequence or attention inhibit period.

Turning now to the Reset bit signal, either a master (signal 311) or the slave (signal 312) may issue a Reset signal at any time. All slaves must generate a Reset when powered up, for at least the minimum Reset time, but no longer than the maximum Reset time. This is done to prevent the bus locking-up during power-up, and providing the system with a level of fault tolerance.

The master must generate Reset at power-up, for at least the minimum Reset time. By this embodiment there is no limitation on the maximum Reset time of the master.

The reset is discernible from the other signal types in that its low level period extends over longer time interval (by a time interval of RstDetect 313, over the Attention request signal). Note that collisions between the Reset and other signals are resolved in similar manner to that discussed above with reference to the attention request signal. Note however that reset terminates any on going transaction thus a re-try is not required.

Those versed in the art will readily appreciate that the invention is not bound by the particular bit signal and bit signal types discussed above and also not by the specific manner of implementation of the specified signals, discussed with reference to FIGS. 3A and 3B. Moreover, the manner in which the bit signal types are discernible one with respect to the other, based on their respective time intervals, as described above, is by no means binding and other implementations are applicable, all as required and appropriate.

By one embodiment, the master can supply power to the slave during the signal inactive time between data bits. One implementation of such device is that when the signal being a '1' at that time charges a capacitor within the slave through a diode. Later during the bit time, the capacitor serves as the power source for the slave and the diode prevents it from discharging into the bus. Also, the drive to a logic '1' can be done using a current source element instead of a simple pull-up resistor.

Note that due to the fact that signals types are discernible one from the other in the manner specified, the bit detection is sensitive to timing measurement accuracy and it has a relatively low sensitivity to additive voltage noise. The bus timing is designed to allow both master and slave variation in their time measurement of up to +−15% from the nominal value. Also, the time allowed for detection of signals is designed to allow glitch removal filters on the bus monitoring for the purpose of eliminating glitch noise and de-bounce of slowly rising edges. The implementation of the input filter is possible in many means commonly known in the art. For example as one simple, and possibly not the most noise tolerable possible, a double sample and check for two consecutive samples to be the same. Other implementation may call for a higher frequency clock for multiple sampling of the signal (for the purpose of a match filter implementation) or an analog glitch removal filter or an histheresis input buffer, or a combination of the above.

Note that noise rejection mechanisms helps the bus to be tolerant to substantially larger amount of noise without its operations being impaired and the ability to discern between one bit signal and the other.

Having described an exemplary set of bit signal types in accordance with an embodiment of the invention, there follows a brief overview of timing considerations that pertain to the bus signals, with reference to the timing chart below.

Thus, by this embodiment, the master and the slaves support, at least the Basic Speed of the Bus. The Basic Speed of the bus is designed to work with a time measurement mechanism with accuracy of at least +−15%. In one embodiment, the time measurement is implemented using a clock with a nominal frequency of, say 360 KHz with a +−15% tolerance (the nominal clock period is 2.775 μSec, with the min. and max. values being 2.36 μSec and 3.19 μSec, respectively) referred to as Basic Speed Clock. In addition to the Basic Speed, master and slaves can optionally support higher speed values for the SWPCBus. By this example, these higher speed values are based on power of 2 multiples of the Basic Speed clock frequency, as follows: Speed X2: the clock frequency is 360 KHz*2=720 KHz Speed X4: the clock frequency is 360 KHz*4=1.44 MHz Speed X8: the clock frequency is 360 KHz*8=2.88 MHz For each SWPCBus speed, the timing parameters (discussed below with reference to Table 1) are scaled from the values defined with reference to the basic speed clock (360 KHz), by the clock multiplication value of the of the SWPC-Bus speed (e.g. 2, 4 and 8 respectively) and compensation for the rise time and fall time of the signals by either reducing the bus capacitance or changing the pull-up resistor value or both. Alternately, if the rise-time and fall-time can not be scaled, the timing can be changed by a value which is not a division of the clock rate. An exception is tRST min, which is not speed dependent to guarantee reset signal will be detected in any case. Also, tRST max, which relates to system fault tolerance is not scaled and should be met.

Note that by this embodiment, an SWPCBus master or slave supporting a high speed also support all the slower speeds (with a lower clock frequency), including the Basic Speed. Moreover, when the rise-time and fall-time are scaled, a SWPCBus master or slave supporting a high speed also support the tf and tr values corresponding to the highest supported speed (with the fastest required rise and fall).

By this embodiment, an SWPCBus master or slave supporting a high speed must be able to switch its time base for time measurement (e.g., clock frequency) to any of the supported time base measurements (e.g., clock frequency) values. Clock frequency switching is performed only after Bus Reset.

Bearing all this in mind, attention is drawn to Table 1, illustrating timing considerations.

TABLE 1

Timing
Table 1. SWPCBus a-synchronous Mode Timing Basic Bus Speed

| Name | Description | Min | Max | Unit |
|---|---|---|---|---|
| $t_{CLKmn}$ | Minimum clock period for A-synchronous mode | 2.36 | | uSec |
| $t_{CLKmx}$ | Maximum clock period for A-synchronous mode | | 3.19 | uSec |
| $t_f$ | SWD fall time | | 300 | nSec |
| $t_r$ | SWD rise time | | 1000 | nSec |
| $t_{INACT}$ | Minimum inactive time (bus at high level) guaranteed by the master before Data Bit or Start Bit; and by the slave, before Attention Request | 11 | | uSec |
| $t_{Mtr0}$ | Master drive for Data Bit 0 write and for Data Bit 0-1 read | 11.8 | 17.0 | uSec |
| $t_{Mtr1}$ | Master drive for Data Bit 1 write | 35.4 | 48.9 | uSec |
| $t_{SFEdet}$ | Time allowed for slave activity detection [ | 1 | 9.6 | uSec |
| $t_{SLout1}$ | Slave drive for Data Bit 1 read | 28.3 | 38.3 | uSec |
| $t_{MtrS}$ | Master drive for Start Bit write ( | 80 | 109 | uSec |
| $t_{SIoutA}$ | Slave drive for Attention Request | 165 | 228 | uSec |
| $t_{RST}$ | Master or slave drive for Reset | 354 | | uSec |
| $t_{RST\_Max}$ | Maximum drive of SWD by a slave, after the power supply raised above 3V. | | 500 | uSec |

Note that while the table provides exemplary timing tolerances for the various signals, the description will focus in two specific examples, i.e. 17.0 µSec—standing for the MAX TMtr0 duration (see 302 in FIG. 3A) and 35.4 µSec—standing for the MIN TMtr1 duration (see 303 in FIG. 3A). The same considerations apply mutatis mutandis to the other values specified in Table 1. Note that the invention is not bound by the specified timing considerations of Table 1, which are provided for illustrative purposes only.

Before any bit is detected, the slave is assumed to already identify that the bus is at its inactive level ('1'). In order for the slave to identify a given signal (say, Master Wr 0, Wr 1 etc. of FIGS. 3A and 3B) the slave must identify the bus signal SWD changing from it's inactive state ('1') to an active state ('0'). In this example it will be shown how the slave discriminates for a bit signal to be a Wr 0 or a Wr 1. Based on the position of the bit in the transaction, the slave is assumed to already identify if the bit signal is a read or write bit and for the sake of example we will show it to be a write bit.

The slave is assumed to be able to detect the signal falling edge within tSFEdet time. This time is designed to allow for the signal falling edge, synchronization to the slaves' reference clock and double sample at that frequency for the purpose of filtering the signal improving the ability to detect noise related interference. Note that this window is of a little over 3 clock cycles of the reference clock at its longest period (lowest frequency).

As suggested, the slave must be able to discern between Master Wr 0 signal and Master Wr 1 with the assumption that the master is driving the signal within the window of tMtr0 and tMtr1 time intervals, respectively. For this purpose, once the signal is detected as active, the slave will start time measurement of the pulse low time, realized by counting number of clocks, and compare to the expected time intervals by comparing to an expected counter value used to discriminate between signals. Accordingly, by this specific embodiment, the max time interval of tMtr0 was set to 17 µSec, meaning less than 7 clocks will be counted (by the slave) during the tMtr0 time interval, even if the fastest clock is utilized (with 2.36 µSec per clock) and the detection of the signal low is within 1 µSec. This is based on the following calculation:

$$17 < 2.36 * 7 - 1 + 1.0 + 0.3;$$

Wherein:
17 stands for the max time interval of tMtr0 in µSec;
2.36 stands for the max clock rate (min period) in µSec;
7 stands for the number of clocks;
−1 stands for the assumed minimal detection time for the signal falling edge (tSFEdet min) in µSec;
stands for the max rising time (tr in table 1, above) of the signal on the bus in µSec; and
0.3 stands for the max falling time (tf in Table 1, above) of the signal on the bus in µSec.
Obviously if slower clock is utilized possibly less number (i.e. less than 6) of clocks will be counted during tMtr0.

Turning now to tMtr1 (in Table 1), the min time interval of tMtr0 was set to 35.4 µSec, meaning more than 7 clocks will be counted (by the slave) during the tMtr1 time interval, even if the slowest clock is utilized (with 3.19 µSec per clock). This is based on the following calculation:

$$35.4 \geq 3.19 * (8+3);$$

Wherein:
35.4 stands for the max time interval of tMtr1 in µSec;
3.19 stands for the max clock rate (minimal) in µSec;
8 is the minimal number of clocks assumed for a Wr 1 signal
3 stands for the maximal number of clock assumed for the signal detection process (tSFEdet max).
Obviously if faster clock is utilized possibly a higher number (i.e. more than 8) of clocks will be counted during tMtr1.

To sum up, a value of 7 can be set as a separator to detect if the bit-signal is a Wr 0 or a Wr 1, thus if the slave counts 7 clocks or less (i.e. "less than or equal to 7") during which the signal is at low level it identifies the signal type as "master write 0". If, on the other hand, the slave counts 8 clocks or more (i.e. "more than 7") during which the signal is at low level it identifies the signal type as "master write 1".

Note that as discussed below, detecting that the signal is longer than a Wr 0 does not mean that the signal is a Wr 1 and the signal active time measurement need to continue to discriminate the bit from being a Start bit, Attention request or a reset.

Figure 4:
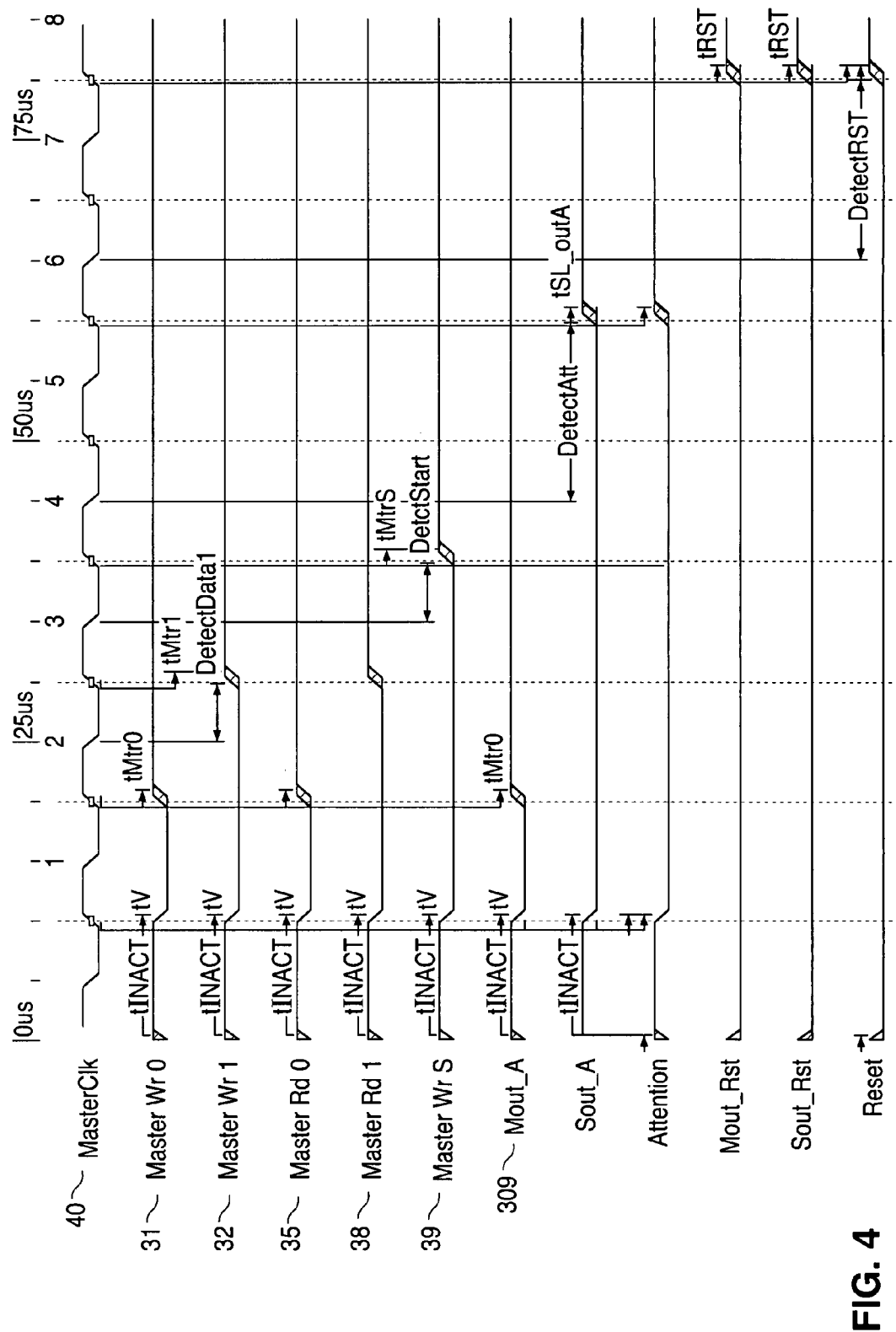
FIG. 4 illustrates a timing chart of various system signals in synchronous mode, in accordance with an embodiment of the invention.

Having described bit signals and timing charts and considerations in accordance with one embodiment of a-synchronous mode of operation, there follows a brief description of synchronous mode in accordance with an embodiment of the invention. As may be recalled a generalized master/slave architecture in accordance with an embodiment of the invention was described with reference to FIG. 2B, where a clock signal is communicated between the master and slave through bus signal 5. The synchronous timing chart depicted in FIG. 4 illustrates the same bus signals of FIGS. 3A and 3B (and bearing the same reference numerals), except for the fact that all signals are synchronized in accordance with clock signal 40.

By one embodiment, the SWPCBus Synchronous mode is intended for systems using clocks with an unstable frequency, or that can not generate pulses with the timing required by the a-synchronous mode. The Synchronous mode uses a timing similar to that of the a-synchronous mode, with the difference that bit signal discrimination are defined in terms of clock edges (cycles) rather than absolute time. The clock low time and high time have minimum values but no maximum values (although bus performance may be affected).

The clock signal "(SWCLK) toggles during the transaction. It must toggle for a complete cycle at least once before a bit signal" and once after a bit signal. It can remain low for an undefined time between bit signals. Attention Request and Reset may start whenever the bus is inactive, even if the clock is not toggling. Once the clock starts toggling the signal should be held low for the period specified for the signal, but no longer than tRST max.

In Synchronous mode, bit signal types (Data Bit 0, Data Bit 1, Start Bit, Attention Request and Reset) are determined by the number of clock edges (cycles) for which SWD is detected active (low). As will discussed in greater detail below, with reference to FIG. 4, attention request and reset are discerned one from the other and also from the Start bit by two clocks to account for ambiguity in the case the clock starts toggling when the signal is asserted. Note that the policy is to drive a bit signal at the clock rising edge and to sample a bit signal at the clock falling edge, to ease the timing constraints on the bit signal. Note also that the policy of number of clock edges used to identify each bit signal may change.

Note that the invention is not bound by the specific implementation of synchronous mode and/or timing considerations, discussed above with reference to FIGS. 2B and 4.

Figure 5:
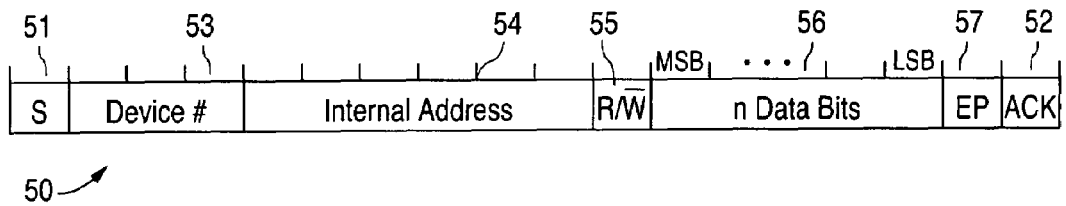
FIG. 5 illustrates a structure of Bus transaction, in accordance with an embodiment of the invention.

Having described the bus signals and timing charts in various embodiments, there follows a description of a non limiting embodiment of various bus transactions (referred to also as read commands or write command). Thus, FIG. 5 illustrates an exemplary read/write bus transaction 50.

During a read transaction, the master reads data from a register at a specified address within a slave. A read transaction begins with a Start Bit 51 and ends with an ACK Data Bit 52. The Device Number field 53 indicates the address of the device number (i.e. slave device) that is accessed for reading data. Note that Address '000' is a broadcast address and is responded to by all the slave devices. Slaves must respond to broadcast messages that are addressed to specific registers (with a defined function for broadcast), all as described in greater detail below.

As will be explained in greater detail below, the Internal Address field 54 is the address of a register within the slave device that is read. The Read/Write (R/W) 55 field has a value '1' for a read transaction (and '0' for write). The Data Bits 56 field is filled with data read from the slave. Data is transferred serially with the most significant bit first. Note that the number of data bits may vary from one address to another, based on the size of the registers in each device. By way of another example, the number of data bits may vary depending upon the specific address in the device and/or whether it is read or written. The specified flexibility allows throughput optimization based on the information that needs to be read. The Even Parity (EP) bit 57 is based on all preceding bits (device number, internal address, read/write, data bits) and the parity bit itself. The parity—number of 1's—of all the preceding bits and the parity bit must be even—i.e., the result must be 0. During a read transaction, the EP bit is sent by the slave to the master to allow the master to check the received data before using it. The acknowledge (ACK) bit 52 is sent by the master indicating that the EP bit was received and was found correct, when compared to the data preceding it, and that no conflict was detected on the bus (excluding Attention Request, discussed above). A read transfer is considered "completed" by the slave only when the ACK bit is received. A transaction that was not positively acknowledged is not "completed" by the slave and the following are performed:

The BER bit in the Device Status register is set (the status register will be discussed in greater detail below).

The slave generates an Attention Request before, or together with the Start Bit of the next transaction.

If the read was of a read volatile data (i.e., a read that causes a change in the slave by the fact it was read, such as a read from a FIFO which extracts the data from the FIFO) the slave will act as if the read didn't occur (i.e., the side effects of the data read operation on the slave state will not occur.

A transaction that was not positively acknowledged is also not "completed" by the master (i.e., internal operations related to the transaction are not performed). The master may repeat the transaction, after detecting the source of the Attention Request (the slave device having a set BER bit in the Device Status register, see below). Note that by this embodiment the protocol neither forces, nor automates re-execution of the transaction by the master. It is the responsibility of the master to perform re-execution of the transaction.

The values of the ACK bit are:
1: Data was received correctly
0: An error was detected (no-acknowledge).

Note that bits that compose the bus transaction are transmitted sequentially using the bit signals, discussed in detail with reference to FIGS. 3A and 3B. Thus, the start field 51 of bus transaction 50 is realized by start bit 39 (see FIG. 3A). Next the device number field 53 (3 bits) is realized by a succession of 3 master write bit ("0" or "1") which the case may be. As may be recalled, the device number (identification) identifies the designated slave device (and by this example possibly one out of seven device and the combination '000' that signifies broadcast message). Reverting to transaction 50, the Internal address field 54 (6 bits) is realized by a succession of 6 master write bit ("0" or "1") which the case may be. Note that the internal address field identifies an internal register in the device, and this will be discussed in greater detail below. Next, a Master Write '1' signal is sent, signifying the read transaction in field 55. Had a Master Write '0' signal been sent for field 55, this would have indicated that the current transaction is write. Next, the contents of the n Data Bits field 56 is filled by the designated slave (depending upon the device number in field 53). Note that the number of the bits in the field may vary inter alia according to designated slave device (field 53) and internal register (field 54).

Next, the Slave calculates and transmits the EP bit 57 (Master read 0 35 or 1 38, which the case may be). By this embodiment, the parity—number of 1's—of all the preceding bits and the parity bit must be even—i.e. the result must be 0. During a read transaction, the EP bit is sent the slave to the master to allow the master to check the received data before using it and to correctly send an ACK. Thereafter, the Ack bit 52 is transmitted in the manner discussed in detail above.

Note that the invention is not bound to the specific realization of read transaction described with reference to FIG. 5.

Having described a read transaction in accordance with one embodiment, there follows a description of a write transaction. Thus, the master writes data to a register at a specified address within a slave. A write transaction begins with a Start Bit and ends with an ACK Data Bit, as discussed above with reference to the Read transaction.

The rest of the fields (discussed with reference to FIG. 5) are identical to those described with reference to the Read transaction, except for: (i) the Read/Write field 55 which contains the bit '0', to indicate the transaction being a write transaction; (ii) the n Data Bits field 56 which is filled by the master with bits for writing in the register (whose address is designated in field 54) in the slave device (whose address is designated in the device number field 53); (iii) the EP field 57 that is filled by the master (instead of the slave as is in the read transaction) and is used by the slave in the validation of the data received, and (iv) the Ack field 52 that is sent by the slave (instead of the master as is in the read transaction and is used by the master as an indication that the data was correctly received by the slave).

Note that the invention is not bound to the specific realization of write transaction described above.

Figure 6:
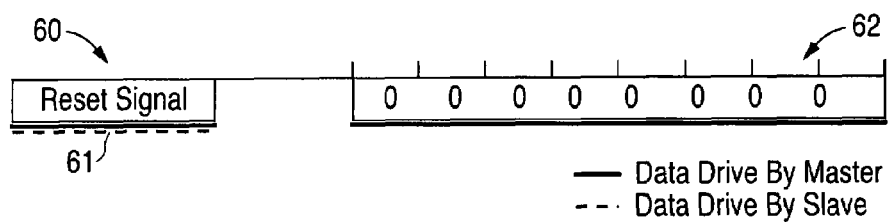
FIG. 6 illustrates a structure of another Bus transaction, in accordance with an embodiment of the invention.

Turning now to FIG. 6 there is shown a structure of another Bus transaction (i.e. bus reset operation 60), in accordance with an embodiment of the invention.

Generating a Reset signal on the bus followed by a training sequence performs the Bus Reset operation. The master applies Reset after power-up, before it starts its operation. Slaves apply Reset as they power-up, until they are capable to communicate. When a slave applies Reset, it holds it for the minimum reset time but no longer than the maximum reset time, all as discussed in the description with reference to FIG. 3B above.

The Reset signal end is monitored by all the devices on the bus. After Reset (61) the master sends a sequence of 8 (eight) Data Bits (62) (constituting training sequence) with a value of '0' (using Write 0 bit Signal), without a preceding Start Bit. This is provided to enable the slaves to "train" their time measurement mechanism such as clocks (if required) based on the time base indication provided by the write 0 bit timing.

Slave devices with high-speed support need to use the 8-bit sequence to switch their clock frequencies to match the time measurement mechanism (e.g., clock frequency) to the new value as set by the master. After the end of the 8-bit sequence, master and slaves will operate at the common bus speed. If desired, although not necessary, a same training procedure may be provided also for the synchronous mode.

Note that the invention is not bound to the specific realization of reset transaction described above. For example, the training sequence may have a different number of bits, may use other bit values e.g., a data bit of '1' or 'Start' or may use a mixture of bit values. Moreover, the write/read and reset transactions were provided by way of example only and accordingly other transactions may be added, all as required and appropriate, depending upon the particular application.

It should be noted that the devices connected to the SWPC-Bus can operate in the same mode, i.e. synchronous or a-synchronous or in combined mode, i.e. some devices in synchronous mode and others in a-synchronous mode provided that the clock edges are properly designed. Note, incidentally, that by the embodiment that was shown in FIG. 4, the attention signal extends over at least 5 clocks where the longest bit signal extends over 3. The allocation of at least 5 clocks for the attention signal instead of 4 which seemingly appear to be sufficient to discern the attention signal from the other bit signals stem from the fact that an attention signal may be initiated by the slave and substantially simultaneously the master may initiate a bit signal giving rise to potential "loss" of one clock signal before a signal is monitored on the bus. The potential loss of one clock is coped with by providing an attention signal that is at least two clocks longer (i.e. by this example at least 5 clocks long) than the other bit signals. For similar considerations, the Reset signal is by this example extending over at least 7 clocks, rendering the attention and the reset signals discernible one with respect to the other even if there is one clock "loss" (which may occur if the master initiates a rest and the slave initiates a-synchronously an attention signal) Note also that a master that is set to operate in a-synchronous mode, but has a SWCLK output, drives the SWCLK with no more than two changes during the Bus Reset. In a system composed of master and/or slave devices capable of operating in both a-synchronous and synchronous modes, but that are set to operate in a-synchronous mode, this allows the devices to identify the mode of operation selected using the SWCLK pin.

A slave can detect master setting to synchronous mode either by monitoring SWCLK during the Bus Reset (see above limit on the number of changes on SWCLK), or by a hardware configuration strap (strap input). As is known per se, a strap input is some kind of external hardware indication (i.e., not information passed on the bus) for setting the device to a desired operation mode. This is normally used by the system integrator to select a desired operating mode for the device.

Having described a master/slave system using a single wire bus in accordance with various embodiments of the invention, there follows a description of a Master Slave Operational Interface (MSOI) forming part of a communication protocol between the master and the slave in accordance with a second aspect of the invention. The master through the MSOI (using bus transactions of the kind disclosed in a non-limiting manner with respect to the first aspect of the invention) facilitates communication between the master and the slave. The MSOI is designed such that the master can communicate with slave devices that support multitude of functions each capable of supporting repertoire of properties. The MSOI is scalable in the sense that the master can communicate with new slave devices supporting functions with properties that were not used in hitherto known slaves, provided that the properties fall in the specified repertoire of properties. This feature is referred to as scalable MSOI characteristics.

The Scalable MSOI characteristics is advantageous inter alia in that a master device (e.g in a form of widely circulated chip device) can communicate (with no need of upgrade) also with new slave devices that are introduced to the marketplace at a later stage, (provided that the properties of the functions of the newly introduced slave devices fall in the repertoire of properties already known to the master). In contrast, in a similar scenario in accordance with the prior art, the master will not be able to support the newly introduced slave device(s), since the latter will naturally have new manufacturer Id # and/or new device Id #, which the master is not familiar with.

It should be borne in mind that for convenience only, in the description of the MSOI in accordance with some non-limiting embodiments below, reference is made, occasionally, to specific details, such as specific bus transactions, described above with reference to the first aspect of the invention. Note that the invention in accordance with the second aspect of the invention is not bound by these specific details.

The repertoire of properties already known to the master (also referred to as supported by the master) can be implemented in the master device directly or as part of the system integrating the master device. The implementation includes some or all of hardware or software elements required to support the different flavors of the properties, hardware or software elements required to read and interpret the properties of functions (e.g., Device Capabilities and Function Capabilities registers) and hardware or software that configures the hardware or software that implements the repertoire of properties based on the interpretation results. Other variants are applicable.

Turning now to an embodiment of an MSOI, a slave device is viewed by the master as a set of registers at pre-defined addresses. The number of bits varies from register to register. In addition some registers have a variable or variable via programming number of bits. Registers may share the same address for read and write, each with a different number of bits. Note, generally, that a set of registers is only one possible implementation of designated storage area locations in the slave.

Reverting now to a specific embodiment, Register size is 8, 16, 24, or 32 bits (the size of non-implemented registers is 0 bits); this enables standard implementation of read/write mechanisms in the master. Register length does not depend on the data stored in the register.

Bearing this in mind, attention is drawn to FIG. 7 illustrating the registers for any device numbers 1-7 (in the specific embodiment where 8 device numbers are used).

As shown, Device Number register 71 at address 00 0000 has 8 bits and it is assigned with the respective device number (i.e. any of 1 to 7) through fixed addressing scheme or through dynamic address resolution (as will be discussed in greater detail below). As may be recalled, the device number field 53 (in FIG. 5) designates the addressed slave. Manufacturer ID and Device ID registers (72 and 73) have values to allow unique identification of the manufacturer and the serial number of the device, and are each 16-bit-long. The rest of the registers (Capabilities Fixed, Device Status, Device Control, Capability expansion, Reserved—74 through 78, as well as function 1 through function 3 registers 701 through 703 and Reserved 704) are available in the common address space of the device. Note that the set of registers define the slave functionality, all as will be discussed in greater detail below.

Figures 8, 9:
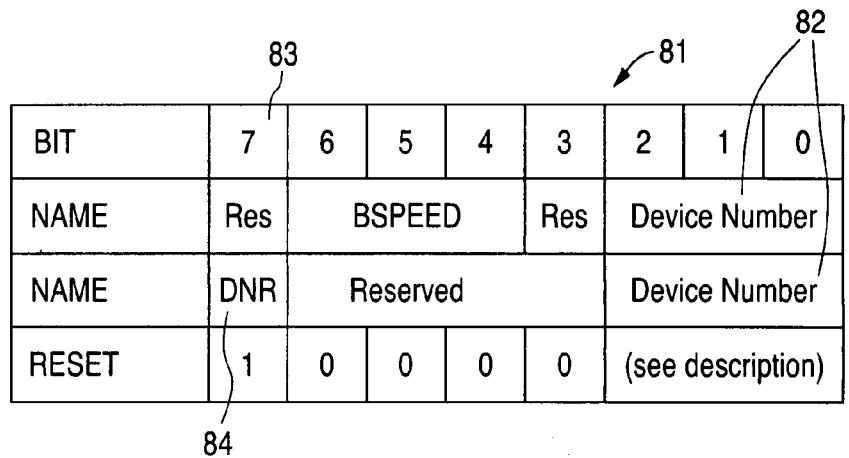
FIG. 8 illustrates a structure of device number register, in accordance with an embodiment of the invention.
FIG. 9 illustrates a table of registers in a slave device, for use in dynamic address resolution procedure, in accordance with an embodiment of the invention.

FIG. 8 illustrates a structure of the device number register 81 (residing at address 00 0000 h—see 71 in FIG. 7), in accordance with an embodiment of the invention. As shown, the three LSBs 82 designate the device number (1-7) and the MSB 84 specifies whether the device supports dynamic address resolution (DAR). Thus, a value 00 h specifies that the device does not exist (note that this is implemented using the property of bit read operation were a bit is read as a '0' if no drive is done by the slave). When reading device number 0, a value of 80 h (i.e. MSB set) indicates that there is a device that supports dynamic address resolution and has not as yet been assigned with address, thus it is currently non-enumerated and disabled. Note that this register is set to 0XXXXnnn (binary value with nnn being 001 through 111) or 1XXXX000 (binary value) in response to reset command, for devices that do not support DAR and devices that do support DAR, respectively.

As readily arises from the exemplary set of registers depicted in FIG. 7, the address space of the device contains a set of registers in fixed location (and later to be discussed in pre-defined structures), to enable the master to easily identify and use standard devices. If additional address space is required for a device, an index-data scheme may be used (preferably for configuration registers). For instance, to expand the address space beyond the space available, one can use one location or a pair of locations for an indexed scheme for accessing additional registers (i.e., provide an index in index part of the register and access the data in the data part).

Note, incidentally, that by this embodiment, all reserved bits have value of '0' when read and '0' should be written to reserved bits. Accessing non-implemented registers and reserved addresses results in undefined behavior. A bit value of "X" is interpreted as either 0 or 1.

As specified above, by this embodiment, a fixed addressing scheme is used wherein slave devices have number specified by hardware (such as fixed number or one selected by a strap option). Upon wake (after Device Reset), the Device Number field 82 of the Device Number register 81 at address 00 0000 (71) is set to the designated address (any of 1 to 7, in case that up to 7 slaves are employed) using a mechanism such as devices with a pre-specified specific device address or devices with strap input (e.g., a pin(s), one or more), used to indicate to the device the system setup required via for example connection to a constant voltage ('0' or '1') or connection of an external component (such as resistor) with a specific value). It is the responsibility of the system designer to avoid two devices having the same device number on the bus.

In operation, slave devices are detected by the master by a read operation of the Device number register (using Read transaction 50 of FIG. 5). The read returns '000' if there is no device at that address on the bus or the slave device has not as yet been assigned with a device number. Any of the values 1 to 7 is returned in case of existing slave device (according to its respective device number being addressed).

Alternatively, or in addition, there is provided a so called dynamic address resolution facilitating dynamic setting of device number to some or all of the slave devices. Those slave Devices with fixed number setting do not need to support the Dynamic Number Resolution protocol or its registers. Note that in many cases fixed addresses are in use to identify the physical location of a device when devices of the same type are used on the bus or when the master does not use other properties of the device to distinguished it For a better understanding of the foregoing, attention is directed to FIG. 9, which illustrates a table of registers in a slave device (number 0), for use (inter alia) in dynamic address resolution scheme, in accordance with an embodiment of the invention. Note that the table includes the device registers that are required for supporting Dynamic Address Resolution (DAR) before address has being assigned to the device. Therefore, the slave device number that identifies these registers is 0, whereas slave device number that identify any (already set) slave device falls in the range of 1 to 7. Note that the set of registers that applies to a slave device having already assigned device number is illustrated in FIG. 7.

There follows now a description of dynamic address resolution in accordance with an embodiment of the invention.

At the onset, slave devices that support dynamic address resolution are disabled (after power up or bus reset) by having 000 in their Device Number field of the Device Number register (91).

The Master device performs the following:

A) Identify the slave device(s) having valid device number (by this example any of 1-7). As may be recalled this is achieved by reading the value of device number (82) from the device number register (81) for the designated slave device. For example, when issuing read transaction (see FIG. 5) where device number field 53 is set to, say 5, and Internal address field (54) is set to 0, and the returned data in the n data bits field 56 is 5, it indicates that device number 5 has been identified and that this device number (i.e. 5) exists on the bus, and cannot be assigned to other device; However, if and the returned data in the n data bits field 56 is 0 this indicates that a value of 0 read from the device number field indicates that the device is not in use and can be later be assigned to a device which is currently not enumerated.

Note that the so identified device number was assigned by either using fixed addressing scheme (as discussed above) or in previous cycle of dynamic address resolution.

The net effect is that the master "knows" which device numbers are already allocated and which are "free" for allocation.

The next step is to search for those slave devices which are not as yet assigned with device number, and assigning thereto numbers, using the following (non-limiting) dynamic address resolution procedure.

B) Search for non enumerated devices:

Master: Read the device number register of broadcast address (0) (using, to this end, read transaction with device number field 53 equals to 0, internal address field 54 equals to 0, '1' in field 55—indicative of "read", all as described above).

Slave: All slaves with DAR that are disabled return '1' in the DAR indication bit of the Device Number register (the MSB 84 of FIG. 8). The so returned data is placed at the n data bit field 56.

Master: If '1' is identified in the MSB (i.e. $8^{th}$ LSB of the n data bits field), this indicates that at least one non-enumerated DAR device exists. Note that at this stage the master cannot discern whether there is one or more than one non-enumerated slave devices. If the MSB value id '0' this indicates that the process is completed, i.e. no additional non-enumerated slave device were detected.

Master: Having detected '1' in the MSB, the master assigns one of the non used device numbers to the Device Number field of the Device Number register, and '0' to the DAR bit of the register. More specifically, the Master issues a write transaction with the device number (53) being '0', the internal address being '0' (54) and the n data bits field (56) being one of the non assigned device numbers, say, number 6. This means that the master wants to assign to the slave a device number 6. As may be recalled the master is not aware at this stage whether there is "pending" one non-enumerated slave device, or alternatively more than 1. In the latter, there must be a conflict resolution process, since clearly it is not allowed that two slave devices or more will have the same device number (by this example 6).

Slave: Store the number (e.g. 6) and start conflict detection mode. Note that if more than 1 slave are pending then each of them implements the conflict detection mode.

Conflict detection:

Master: read the following registers in this sequence:

1) Manufacturer ID register (16 bit long) of device number 0. (92 of FIG. 9). This register is a part of the device fixed structure. It identifies the device manufacturer and its Location: 00 0001;

Device ID register (16 bit long) of device number 0. (93 of FIG. 9). This register is a part of the device fixed structure. It identifies the device among devices produced by a manufacturer. Location: 00 0010;

Device S/N register (32 bit long) of device number 0 (94 of FIG. 9). This register is a part of the device fixed structure. It intends to identify the device among other identical devices (same manufacturer and device ID) for the purpose of DAR. Thus, in a system with more than one device of the same type and made by the same manufacturer, a unique ID for the device (e.g., a serial number) can be used to differentiate between the devices so they can be assigned with different addresses.

By this embodiment, the location: 00 0011 (binary) being assigned to the Device S/N register can be accessed only using broadcast address during conflict detection phase of the DAR process.

Slave: respond to the read command while monitoring the data bits on the bus. For any bit in the data field which the slave drives as a '0': if the data on the bus is '1', then a conflict is identified. Note, a conflict will typically arise when 2 or more slave devices participate in the conflict resolution process (e.g. the two slaves that stored, for example, the '6' value) and both respond to the read command of device ID register (93 of FIG. 9). Since, however, each slave device has a unique ID, it necessarily arises that two different values will be written on the bus. Assume, for example, that the device ID of a first slave is 001XXX (XXX signify the LSB 13 bits) and that of the second slave is 000XXX (XXX signify the LSB 13 bits). Note that in the latter the 3rd MSB is '0' compared to '1' of the former. Thus, when the third bit is driven on the bus in response to the read transaction of the master (for the device ID register), it will be a "wired OR (of the bit signals based on the length of the data bit)" operation between '1' (for the 3rd bit of the first slave) and '0' (for the 3rd bit of the second slave), giving a result of '1' on the bus. Since both slaves monitor the bus, the second slave will readily notice that there is discrepancy, i.e. '1' on the bus instead of expected '0'. The second slave, thus, notices that there is a conflict and in response it exits the conflict detection mode and reset the Device number register (including, of course, the DAR bit 84) to its default value 80 h, meaning that this slave device is ready to participate in the next cycle of address resolution. The other (first) slave continues in the address resolution procedure.

Slave: if S/N register (94) read is completed successfully without a conflict detection (in the example above, this applies to the first slave), the device is enabled using the address assigned to the device, and conflict detection is completed. In other words, in the example above, the first slave is assigned with device number 6, and whenever reference is made to device number '6' (53 in FIG. 5), then the set of registers for this slave device (as depicted in FIG. 7) apply. The specific register from among this set will be determined according to the contents of the "internal address" field (54 in FIG. 5).

Master: Repeat the address resolution processes described above, until all devices are enumerated i.e., all slaves with DAR were enumerated. An error is declared if non-enumerated devices exist after all 7 possible device numbers are used.

Note that the invention is not bound by the specified dynamic address resolution process.

Having described fixed addressing and dynamic address resolution schemes in accordance with an embodiment of the invention, there follows a description of the device functionality and the device repertoire of functions properties in accordance with an embodiment of the MSOI of the invention. More specifically, it includes by this embodiment the 16-bit-long capability register (74 in FIG. 7) located at address 00 0011 (for devices 1 to 7 only and not for the broadcast address 0). This register has a fixed structure providing information on the supported functions of the device, serving as general information of the functions properties. Additional functions and their properties may be defined in a manufacturer-defined format as part of expansions to the standard functions description, and as part of the Capability Expansion register (77 in FIG. 7). For a better understanding of the foregoing, attention is drawn to FIG. 10 illustrating the structure of a capability register and to FIG. 11 illustrating functions descriptor table, in accordance with an embodiment of the invention. As shown in FIG. 10, bits 0-3 of register 100 stand for the descriptor of the first function. The function descriptors are codes pre-defined to identify general properties of the function set forth in the table of FIG. 11. Thus, 0000: indicates that the Function is not available (the master should not access its registers).

0001: indicates that function # 1 is of Temperature Measurement type.

0010: indicates that function # 1 is of Voltage-Only Measurement type.

0011: indicates that function # 1 is of Voltage Measurement with $V_{core}$ support. (Dynamic VID, VRD_GOOD or Static VID)

0100: indicates that function # 1 is of $E^2$PROM type.

1100-1111: Manufacturer-specific function types. Reserved for assignment by manufacturer.

other: Reserved for future expansions of the specification (e.g., a GPIO function).

The same function descriptor codes apply to function 2 (bits 4-7) and function 3 (bits 8-11); Accordingly, by this specific example, the general function properties include indication whether a function is available and, if exists, its type (Temperature, Voltage, etc.).

Note that in addition, there is provided a possible capability expansion (constituting yet another example of general function properties), for supporting additional functions. The capability expansion register is 77 (FIG. 7) and is located at address 00 0110 (for devices 1-7 only). Its size may vary from 0 (i.e. no capability expansion provided) to 32 bits (see number of bits for the capability expansion register 77 in FIG. 7). The size of the capability expansion register is defined at bits 12-15 of the capability register 100 (see also bits 12-15 at the table of FIG. 11). Thus, the master can read the capability register 100. Use the information read to determine the size of the capability expansion register 77 and based on that read the data stored in that register.

Thus, for example, if the master reads the capability register of device 5 (using read transaction with device=5 (field 53) and internal address=3 (field 54), identifying the capabilities register) and in response the data read from the n data bits field 56 is, say (0000 0010 0000 0001)b this indicates that function #1 is a temperature measurement function, there is no function #2, function #3 is a voltage measurement function, and that capability expansion is not provided.

Having identified the supported functions and the general function properties, a more detailed description of the function properties is found in designated storage known to the master for the purpose of identification of the specifics of the function description for later use. The detailed description of the function properties will be discussed in details later on. Note that the invention, in accordance with the second aspect, is not bound by the sub categories "general" and "detailed" properties as discussed herein, and, likewise, not by the specific contents of these categories.

Thus, for devices 1-7 (or other number of devices, which the case may be), the set of registers for function # 1 are found at an offset from the address base of 00 1000 (i.e., 00 1xxx, see 701 in FIG. 7); For devices 1-7 the registers for function # 2 are found at an offset from the address base of 01 0000 (i.e., 01 0xxx, see 702 in FIG. 7); For devices 1-7 the registers for function # 3 are found at an offset from the address base of 00 1000 (i.e., 01 1xxx, see 703 in FIG. 7). Reverting now to the example above where (for device 5), function #1 is a temperature measurement, then the corresponding set registers will be found at offset 00 1xxx, and function #3 is a voltage measurement, and the corresponding set of registers will be found at offset 01 1xxx. The contents of these specific registers will be discussed in greater detail below.

Those versed in the art will readily appreciate that the invention in accordance with this aspect is not bound by using set of registers as designated storage(s) for indicating which functions are supported and for determining detailed function properties. In other words, any storage space at designated location (known to the master) is applicable.

Obviously the invention is not bound by this specific architecture as depicted in FIGS. 7, 10 and 11, which are provided in this specific form for illustrative purposes only.

Turning now to the device status register (75 of FIG. 7), it is elaborated in FIG. 12. This register is 'reset' by a Device Reset, or by a Bus Reset and its Location is: 00 0100. As shown in FIG. 12, bits 0-2 of status register 120 signify whether there is any new input (i.e. occurred event) in respective functions #1 to #3; Bits 4-6 signify if an error has been encountered in the respective function #1 through #3; and bit 7 indicates bus error (which is encountered, e.g. parity error, no Ack received, etc.).

The attention request generation scheme and the device scanning loop (discussed below with reference to FIG. 21) are related to the read of the device status register in a way that any event in a function which has an attention enabled will be detected by reading of the device status register before the master will rest. The 'resting' state of the master means that the master is waiting for a new attention request.

By one embodiment, the attention generation scheme is optimized to reduce the number of attentions on the bus by generating an attention request when (1) A Function event that sets the Status Flag occurred for at least one of the functions, and Attention Request is enabled for it, and (2). The "physical" condition for an Attention Request is met (i.e., the bus is inactive), and (3). At the first time, (2) is met after (1) had occurred, there has not been an Attention request on the bus since a read of the Device Status register, or since a Bus Reset.

or (1). A bus error event occurred, and (2) The "physical" condition for an Attention Request is met (i.e., the bus is inactive), and (3) At the first time (2). is met after (1) had occurred, there has not been a Bus Reset.

Turning now to the control register (76 in FIG. 7), (also forming part of the slave device functionality in accordance with this embodiment), it is shown in more detail, with reference to a specific embodiment as illustrated in FIG. 13 and associated table in FIG. 14. This register is used to control operations common to all functions.

The control register responds to a normal read and write transaction (using the device address) or to the broadcast write transaction (DeviceNumber 000). Write using broadcast address is ignored by bits 15-2. However, for bit 0 (131) set, the devices are reset meaning that all functions within the device are set to their default state. Note that the latter reset differs from the 'bus reset' (discussed with reference to the first aspect of the invention above) in that 'bus reset' does not rest the functions but only the communication protocol. Example of reset operation (that is triggered when bit 131 is set) is loading of 'control register' with its default value at which among other things all functions are disabled. The ability to access the reset bit either on one specific device or on all devices simultaneously, provides the ability to reset an individual device (in the former) or reset all devices on the bus simultaneously (in the latter).

Bit 1 (132) indicates, system shutdown, i.e. when set to 1 this bit stops the operation of all functions and places the device in the lowest power consumption mode. Similar to the reset operation this provides the ability to control the power down operation of specific device, or of all devices on the bus simultaneously.

Bits 2-15 of the control register 130 signify instructions to designated slave device, according to the addressed device number, as follows (see also table of FIG. 14):

Bit 2: LowPwr (Low-Power Mode). When set to "1" this bit slows the operation of all functions and places the device in a low power consumption mode. In Low-Power Mode, each enabled function behaves in the way described for the specific Function Type for its behavior in low power mode.

0: Device in Active Mode. (default)
    1: Device in Low-Power Mode.
    Bit 3: reserved
    Bit 4: EnF1 (Enable Function 1). When this bit is set to "1", Function 1 is enabled for operation. A function may require setup before this bit is set. The function registers can be accessed even when the function is disabled.
    0: Function 1 is disabled. (default)
    1: Function 1 is enabled.
    Bits 5-6: EnF2 and EnF3 (Enable Functions 2 and 3). Same as bit 4 (however for functions 2 and 3, respectively).
    Bits 7-11: reserved
    Bits 12-15: reserved for manufacturer specific enhancement.

Bearing all this in mind, there follows a description of the temperature measurement function, in accordance with an embodiment of the invention. Note that the invention is not bound by this specific temperature measurement procedure, and accordingly variants thereof are applicable, all as required and appropriate.

The invention is, likewise, not bound by the other functions discussed in the specific examples with reference to FIGS. 10 and 11, above.

Turning now to the temperature measurement function in accordance with this embodiment, it is capable of measuring the temperatures of diodes and transistors (either stand-alone or integrated in chips). The function measures multiple temperature points, either internal (to the device) or external, and reports the readout to the master. The measurement of all the enabled temperature sensors is cyclic and continuous. The temperature measurement function utilizes a set of designated registers residing in address area 00 1XXX, or 01 0XXX, or 01 1XXX, for the first second or third function respectively (701 to 703 in FIG. 7). Note that the use of set of registers as designated storage for identifying the detailed properties of the temperature measurement function, is only one out of non limiting variants, and the invention is not bound by this specific implementation.

Bearing this in mind, assume that the first function is active for a given device (by setting bits 0-3 of the capability register to 0001 (see FIG. 10)) and by enabling bit 4 (function # 1) of the control register (see FIG. 13), then the set of registers for the temperature measurement function for this particular device would reside in address 00 1XXX and up.

The register address map for the temperature function is defined as an offset from the function base address (00 1XXX), and is illustrated in the table of FIG. 15.

There follows a brief overview of the main registers that are utilized by the temperature measurement function. The control register 151 of the function (residing at offset 010b relative to the base address) defines which temperature sensors are included in the scan. A sensor is scanned only if it is enabled by the Sensor Enable bit (ENm) (as will be explained in greater detail below). The sensors are scanned in an ascending, round robin order, based on the sensor number. Disabled sensors are skipped and the next enabled sensor in ascending order is scanned.

By this embodiment, the minimum scan rate in Active Mode is recommended to be 4 Hz (i.e., the measurement data for each sensor is updated at least once in 250 ms). In Low-Power Mode (controlled by bit 2 of the control register 130 of FIG. 13), the scan rate is four times lower than the scan rate in Active Mode.

When a new result is sensed by the temperature sensor it is stored in the Readout register (152) (residing at offset 001b relative to the function's base address). Note that by this embodiment, the result is guaranteed to stay in the register for the master to read it. Note that the slave may choose either to delay the measurement of new result or to buffer results measured while waiting for the master to read the pending result. A result is lost only if it was not read within predetermined timeout and the data in the Readout register was overwritten. This condition is posted as an error in the function error status bit in the device status register 120.

By one implementation, the function has a double buffer that allows one pending result and one on-going conversion (i.e., new temperature measurement performed by the temperature measurement mechanism while a previous result is waiting for the master to read it from the readout register). It is allowed to obtain additional results ahead of time, thereby improving throughput in some cases. If all sensors are buffered (and in some cases just after a timeout, or a combination of both) the new result is ready before the previous result has been read, the new result overwrites the previous result.

The Readout register contains the temperature data, the sensor number and additional status flags for PROCHOT support, (the latter will be discussed in greater detail, below).

The resolution of the readout is defined in the Function Capabilities register (153) (which will be discussed with greater details below), residing at base address+offset 000b. Note that the location of this register and its structure is also pre-known to the host as part of the general properties of the temperature function. The function capability register also provides detailed description of other properties of the function to be detailed later on. The accuracy of the reading depends on the implementation of the analog part of the device and may be other than the resolution, and lower than the resolution, in most cases. The accuracy may also vary depending on range. The accuracy is not specified here since it does not impact the interpretation of the read result. The temperature readout value format (read from the readout register—discussed below) is common to all the sensors (e.g. left alignment of the data stored in a designated field in the register). By this embodiment the common format applies regardless of whether the data is unsigned, positive fixed point value, or a signed, 2's complement fixed point value. The readout format is specified in the Function Capabilities register.

Note also that the readout register constitutes an exemplary common interface of communication between the master and the slave, as will be discussed in greater detail below with reference to FIG. 17.

The temperature Measurement function generates an Attention Request (described in detail above with reference to the first aspect of the invention) to the master whenever a temperature conversion cycle is completed and new data is stored in the Readout register.

By this specific example, in addition to the main task of temperature measurement, there are provided one or more supplemental task, a non limiting example being the PROCHOT, whose operation will be discussed in greater detail below.

Bearing all this in mind, there follows a more detailed discussion of the various registers that form part of the temperature measurement function.

Thus, attention is drawn to FIG. 16, illustrating the structure of a temperature measurement capability register (located at offset 000b-153), in accordance with an embodiment of the invention and to the following table which illustrates detailed properties of the temperature measurement function (such as resolution of measurement, number of bits of the read temperature, etc.).

| | Bits Description for the capability register | |
|---|---|---|
| Bit | Type | Description |
| 0-2 | RO | Resolution. This field defines the value of 1 LSB of the Temperature Readout field in the Readout register. The Temperature Readout contains the temperature value in deg C. as either unsigned, or signed 2's complement, fixed point type; Resolution field defines the number of fraction bits of this temperature value.<br>000: Value of LSB is 1.000 deg C. ($2^0$) - 0 fraction bits<br>001: Value of LSB is 0.500 deg C. ($2^{-1}$) - 1 fraction bit<br>010: Value of LSB is 0.250 deg C. ($2^{-2}$) - 2 fraction bits<br>011: Value of LSB is 0.125 deg C. ($2^{-3}$) - 3 fraction bits<br>100: Value of LSB is 0.0625 deg C. ($2^{-4}$) - 4 fraction bits<br>other: Reserved for future expansions of the specification |
| 3-5 | RO | Number of Bits. This field defines the total number of significant bits of the Temperature Readout field in the Readout register. The temperature data is always aligned to the left in the Temperature Readout field and is extended with zeros.<br>000: 8-bit<br>001: 10-bit<br>010: 11-bit (maximum available for RoutSize = 0)<br>011: 12-bit<br>100: 14-bit<br>101: 16-bit<br>other: Reserved |
| 6 | RO | Sign (Signed Data). Defines the type of data in the Temperature Readout field of the Readout register.<br>0: Unsigned, positive fixed point value.<br>1: Signed, 2's complement fixed point value (i.e. for representing temperature below zero). |
| 7 | RO | RoutSize (Readout Register size). Defines the number of bits of the Readout register. Thus, for example, for '0' 16 bit apply, meaning that when Data readout register is read (at offset 00lb [152 in FIG. 15], only 16 bits of data are relevant; and for '1' this indicates that 24 bit of data are relevant)<br>0: 16 bits.<br>1: 24 bits. |
| 8 | RO | IntSens (Internal Sensor Support). Indicates if the function has an internal Temperature Sensor. Internal temperature sensor, is capable of sensing the temperature inside the measuring device.<br>0: No Internal Temperature Sensor.<br>1: Internal Temperature Sensor implemented. |
| 9-11 | RO | Number of Sensors. Specifies the number of external Temperature Sensors supported by the function. External sensors are numbered 1 and above.<br>0: No external Temperature Sensors supported.<br>1-6: The number of external Temperature Sensors supported. |
| 12-13 | RO | PROCHOT Pins. Specifies the number of PROCHOT pins supported by the function. Notes that the functionality of bits 12-13 and 14, will be discussed in greater detail below, in connection with the PROCHOT function.<br>0: PROCHOT functionality not supported.<br>1-3: Number of PROCHOT pins supported. |
| 15 | — | Reserved for future expansions of the specification. |

Turning now to FIGS. 17A-B, there is shown a structure of a Temperature Function Readout Register (170), in accordance with an embodiment of the invention. The size of this register varies as indicated in the Function Capabilities register (see bit #7 for of the function capability register (160), discussed above). This provides additional detailed properties of the temperature measurement function, such as the size of the readout field and the sensor number to which the read temperature data pertains.

The Location of the Readout register 170 is: address Base+ 001b (see 152 in FIG. 15). Attention is now drawn to the following table which illustrates a functional description of the various bits and fields of the temperature measurement. readout register, in accordance with an embodiment of the invention. Note that the use of readout register (and in particular the temperature readout field—see table below) is an example of common interface designed to report the data in a way that helps the master easily handle it with respect to different sensors obviating the need to use distinct addresses for each sensor in order to send or receive data from that sensor, as is the case in prior art solutions. In other words, the master accesses the common interface (at a distinct address, e.g. address Base+001b) and receives data from different sensors in the Temperature readout field (where the sensor number is designated in the Snum field—see table below). By one embodiment, there is also provided a common format (by this example left alignment of the data in the readout field to facilitate interpreting of different data types from different sensors in a simple way. The different data types are affected by the resolution of the readout, the significance of the least significant bit (LSB) and the use (or non use) of sign extension.

Note also that the readout register structure enables associating an additional result with the main read result using the SEF bit. This additional result is expected to be one that is used less frequently than the main sensor result. In the temperature function the PROCHOT function is associated with the sensor related to it using the SEF bit.

Those versed in the art will readily appreciate that the invention is not bound by this particular implementation of common interface for the temperature readout function. The common interface is of course applicable also for other functions.

| | Bits Description for the data readout register: | |
|---|---|---|
| Bit | Type | Description |
| 0 | RO | SEF (Sensor Event Flag). This bit indicates that an event associated with the current Temperature Sensor has occurred.<br>If PROCHOT is supported for the current Temperature Sensor, SEF flag indicates that a new PROCHOT result is available for the associated PROCHOT Input. This bit is cleared by reading the PROCHOT Read register of the PROCHOT Input, associated with the current Temperature Sensor. Note that the functionality of this bit will be discussed in greater detail below, with reference to the PROCHOT function.<br>0: No Sensor Event.<br>1: Sensor Event occurred. |
| 1 | RO | EF (Error Flag). This bit indicates that an error was detected during the measurement of the current Temperature Sensor.<br>0: No error detected.<br>1: Error detected. |
| 2-4 | RO | SNUM (Sensor Number). This field indicates the number of the current Temperature Sensor, to which the data in the Temperature Readout field belongs. As may be recalled Temperature Sensor 0 is always assigned to the internal sensor of the device, whereas 1-7 indicates external sensor. |
| 5-7 (24 bit) | — | Reserved for future expansions of the specification. |
| 5-15 (16 bit register format) or 8-23 (24 bit register format) | RO | Temperature Readout. This field holds the result of the temperature measurement. The size of this field is either 11 bit in the case that bit #7 of the function capabilities register 160 (in FIG. 16) is set to '0' or 16 bit in the case that bit #7 of the capabilities register 160 (in FIG. 16) is set to '1'. In both cases, if the Number of Bits defined in the Function Capabilities register is smaller than the size of this field, the result is aligned to the left and the LSBits are filled with zeros. Note that this field defines the maximal number assigned to temperature readout. The actual number of bits in this field that signify the temperature value are prescribed according to the "Num- |

-continued

Bits Description for the data readout register:

| Bit | Type | Description |
|---|---|---|
| | | ber of bits" field (bits 3-5) of the function capabilities register 160. For example in case of 000 value in bits 3-5 of the capabilities register, this indicates 8 bits temp data. In case 100 in this field, this indicates 14 bits of temp data, etc. Note that The format of the data in this field is either an unsigned positive value (if Sign = 0), or a signed 2's complement value (if Sign = 1), according to the sign filed (bit #6) of the capability register 160. In case of Error this field will read 80h or 8000h. The size of this field and thus the number of bits in this register may vary depending on the capabilities of the master and the accuracy of the function. The number of bits in this field is set by DRS field in the function's Control Register. |

Turning now to FIG. 18, there is shown a structure of a Temperature Function control register (180), in accordance with an embodiment of the invention. This register is set to the reset value by a Device Reset and is located at. Location: Address Base+010b (see 151 of FIG. 15). Attention is now drawn to the following table which illustrates a function descriptor table for the temperature measurement control register, in accordance with an embodiment of the invention.

Bits Description for the Temperature measurement control register:

| Bit | Type | Description |
|---|---|---|
| 0 | R/W | ATE (Attention Enable). When set, this bit enables an Attention Request from the enabled Temperature Sensors, to be generated by the device. Accordingly, if this bit is enabled, an attention request bit signal is issued whenever an event of a new result being put to the readout register occurs. This is done under the conditions of attention request generation. Note that the command to enable/disable any of sensors 1-7 is prescribed by bits 1-7 of control register 180, as is further discussed in this table. The Attention Request is generated when a new temperature result is stored in the Readout register. Attention Request disabled (from any enabled Temperature Sensor - default). 1: Attention Request enabled. |
| 1 | R/W | EN0 (Enable Sensor 0). When this bit is set, Temperature Sensor 0 is enabled for temperature measurement. The bit is a read-only bit ('0') if the sensor is not supported by the device. 0: Temperature Sensor disabled (default). 1: Temperature Sensor enabled. |
| 2-7 | R/W | EN1-EN6 (Enable Sensor 1 - Enable Sensor 6). Same as EN0 for Temperature Sensors 1-6. 0: Temperature Sensor disabled (default). 1: Temperature Sensor enabled. |
| 8-15 | — | Reserved for future expansions of the specification. |

This provides additional detailed properties of the temperature measurement function, such as whether to enable/disable Attention Request from the enabled Temperature Sensors (see ATE above).

Figures 19, 20, 22:
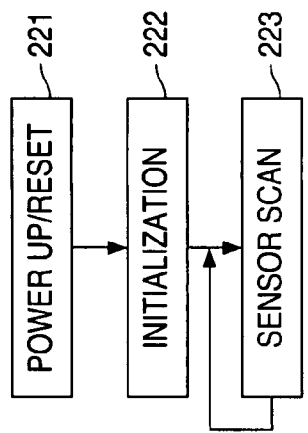
FIG. 19 illustrates the structure of a temperature measurement PROCHOT select register, in accordance with an embodiment of the invention.
FIG. 20 illustrates the structure of a temperature measurement PROCHOT read register, in accordance with an embodiment of the invention.
FIG. 22 illustrates a flow chart of the operational sequence of a slave, in accordance with an embodiment of the invention.

Turning now to FIG. 19, there is shown a structure of a Temperature Function status register (190), in accordance with an embodiment of the invention. This register provides status information for the Temperature Measurement function and is set to the reset value by a Device Reset. In this specific example there is no data provided as part of the function's overall status. However other functions may utilize such a register for providing various status information (e.g., if a buffer is implemented to store results, how many elements are there is the buffer at this moment, for enabling burst read of the buffer. Its Location is: Address Base+011b (see 154 of FIG. 15).

Turning now to the PROCHOT function, as is well known, this function provides indication that the processor's temperature, exceeded a given threshold and that certain cooling measures were taken (such as reducing clock rate, etc.) Note that there are certain applications which require indication that PROCHOT condition occurred and/or the percentage of time that PROCHOT is active within a time frame.

In accordance with an embodiment of the invention, the master can indicate to the slave that PROCHOT indication should be provided (e.g., using enable bits in the PROCHOT control register such as the one mentioned in FIG. 15), and accordingly when PROCHOT indication is detected by the slave, it will indicate on the same to the master. There follows a brief description of PROCHOT monitoring sequence, in accordance with an embodiment of the invention.

At the onset, the slave specifies, whether the PROCHOT monitoring service is available and how many such inputs exists (they are associated with known sensors), through bits 12-13 of the capabilities register 160 at FIG. 16, where '0' signifies no PROCHOT support and 1-3 signifies how many PROCHOT pins are supported. For example, if 2 PROCHOT inputs are provided the current embodiment will associate them with sensors 1 and 2. Now, when PROCHOT event occurs, the SEF bit (bit #0 in the Temperature measurement Function Readout register depicted in FIG. 17A or B) is set, and this indicates to the master that there is available PROCHOT data. The master then needs to select which PROCHOT pin entry to read based on the sensor that indicated a need for that using the SEF bit (as may be recalled there can be up to 3 PROCHOT pins, see bits 12-13 of the capability register of FIG. 16), and this is done by designating the desired input number in bits 0-1 of the PROCHOT select register 190 (see FIG. 19). Note that the PROCHOT select register resides at location: base Address +100b (156 in FIG. 15) for write operations.

Having identified which PROCHOT input to read, The master accesses PROCHOT Read register (200 depicted in FIG. 20). Note that bits 0-1 of register 200 indicate the PROCHOT input read, and should match the desired PROCHOT input that was indicated in bits 0-1 of the PROCHOT select register (190). The actual PROCHOT data is read at bits 8-15 of the PROCHOT read register (200).

The mechanism where the select data is written and than read back with the selected data, overcomes potential problem due to interleaving of threads in the master as long as the data is not a read volatile data (e.g., one thread is trying to read PROCHOT 1 while the other PROCHOT 2 and the results get confused since the write operations overrun the PROCHOT select register contents). In case the master finds that the selected input changed it should repeat the process.

The PA_Valid (PROCHOT Active Valid) bit (#7 in register 200) indicates that the PROCHOT Active Field (bits 8-15 of register 200) contains a new value. This bit is cleared when read. When PA_Valid bit is set, the Sensor Event Flag (SEF) bit (bit #0 in Temperature measurement readout register of FIGS. 17A-B) for the associated Temperature Sensor number is set. The values for PA_Valid bit are:

0: PROCHOT Active Field contains either an invalid value, or a value that has already been read.

1: PROCHOT Active Field contains a new value.

Note that the PROCHOT select register 190 and the PROCHOT read register 200, are both located at base address+100b, however, the former is a "write" register (156 in FIG. 15) and the latter is "read" register (155 in FIG. 15).

The PROCHOT control and force PROCHOT registers residing at locations base address+101b and base address+110b, respectively, are PROCHOT specific registers, which will not described herein.

Those versed in the art will readily appreciate that other functions, such as voltage measurement function are applicable, all depending upon the particular application. Note also that the invention is not bound by the functionality of the temperature measurement function with respect to a specific set of registers, as described above.

In the description above, a repertoire of function properties has been exemplified with reference to a specific temperature measurement function. By the specific example described above, the repertoire of function properties included general function properties, (such as those referred to with reference to the Capabilities Register described with reference to FIG. 10) and detailed function properties (such as those described with reference to the Temperature Measurement Function Capabilities Register described with reference to FIGS. 16 and 17). Note that the invention is not bound to any specific categorization of function(s) properties, and, accordingly, the use of the specific categories general function properties and detailed function properties are only an example. Moreover, the specifics of the properties and their manner of implementation, for instance the capability register (see FIG. 10) and the structure/contents thereof and/or the Temperature Measurement Function Capabilities Register (described with reference to FIGS. 16 and 17) are provided by way of example only and are by no means binding.

Those versed in the art will readily appreciate that the master can communicate in a generic fashion with slave devices provided that their function(s) properties are within the repertoire of the function properties supported by the master. This give rise to a scalable MSOI characteristics since the same master can support newly introduced slave devices, obviating the need to upgrade the master, as would have been the case had prior art techniques been used.

For instance, suppose that a master is circulated in the marketplace with the repertoire of functions properties as discussed above. Assume also that the slave devices that are available in the market (when the master is introduced) are those that support only temperature measurement function (i.e. the Func Descriptor field in the capability register of FIG. 10 can only have the values 0000 signifying that a function is not available or 0001 signifying that Temperature measurement type is supported—see bits 0-3 in FIG. 11); Assume also that the specified slave devices support a value of 1 LSB of the Temperature Readout field in the Readout register 160 in FIG. 16 for only 1 degree or 0.5 degree, i.e. only the 000 or 001 combinations are valid for the resolution field of the Readout register—see FIG. 17.

Now, in accordance with the second aspect of the invention, when a new slave device will be introduced to the market with additional properties that fall in the repertoire of function properties of the master, due to the scalable MSOI characteristic the master will be able to support also the newly introduced slave without requiring any retrofit. For instance if the upgraded slave devices support also voltage measurement type ('0010' in bits 0-3 in the capability register of FIG. 10) and further support a more fine resolution temperature measurement, say 0.25 degree—i.e. '010' in bits 0-2 of the Temperature Measurement Function Capabilities Register (see FIG. 17), then the master will be able to support also the upgraded slaves without need to any upgrade. Of course, if the slave device will also support function properties which are beyond the repertoire of function properties that are known to the master (say, the slave further support a speed measurement function that is not part of the capabilities register of FIG. 10) an upgrade of the master is naturally required.

Note that in accordance with the prior art, the scalable MSOI characteristics does not apply since, as a rule, a master identify slave devices according to identification data, such as manufacturer Id number and/or device Id number. Thus, according to the prior art, when the upgraded slave device is introduced to the market, it is naturally identified by a new Id (indicative of, say the new manufactured series) which is not known to the master and, therefore, the latter will not be able to recognize the newly introduced slave and naturally will not support it, notwithstanding the fact that the upgraded slave has functions properties that fall in the master's repertoire of function properties.

Having described a set of temperature measurement related registers, in accordance with an embodiment of the invention, there follows a description of a typical, yet not exclusive, sequence of operation of a slave device and a master device, in accordance with an embodiment of the invention.

Turning at first to the master (FIG. 21), when the system is started it executes the device enumeration process 211 (discussed in detail above) and thereafter identifies 212 the so enumerated devices (e.g. identifying the capability register, the functions, etc.). Next, the devices are initialized (213) including, for instance, enable of the functions, enable specific properties of the functions, and enable the attention request etc. Then, an operating loop 214 commences whilst receiving and responding to external events not shown in the drawing, such as request to switch the system to power save mode, etc.

In the operating loop, in response to attention signal (shown as exit from 2103) and possibly at the entry to operational loop, the master polls the active slave devices, starting with say device n (215) (any of 1 to 7). As may be recalled, the master is aware of the active slave devices actually implemented in the system, since slave device numbers were either set through fixed addressing scheme and/or using dynamic address resolution, discussed in detail above and got enumerated in step 211.

The master reads the status register (120 in FIG. 12) of the polled device and in the case that bus error is encountered 216 appropriate error handling procedure is activated 217. The contents of the error handling procedure may vary, depending upon the particular application (e.g., perform a bus reset for re-training or re-execute the last transaction that possibly failed). Assuming that no bus error is encountered, the master notes whether an event (or error) occurred in function # 1 218 (according to: set SF1 bit and/or EF1 bit). In the case that the SF1 bit is set, an appropriate procedure is invoked 219 which includes by this example reading data from readout register (e.g., the Temperature measurement function register (in FIGS. 17A-B). If the readout registers show error (EF bit in FIG. 17A or 17B) is set, handle it (a non limiting example of error handling, is reporting to a system manager of the event). If the sensor shows an additional data is available using SEF bit being set, go to the function (PROCHOT in the case of Temperature function) and read that additional data. Pass the information read to a section of the master that processes it. If an error was detected in EF1 this is an indication of an overrun of the buffer, this information may be passed to higher level applications such as one that is used during a system debug.

Figure 21:
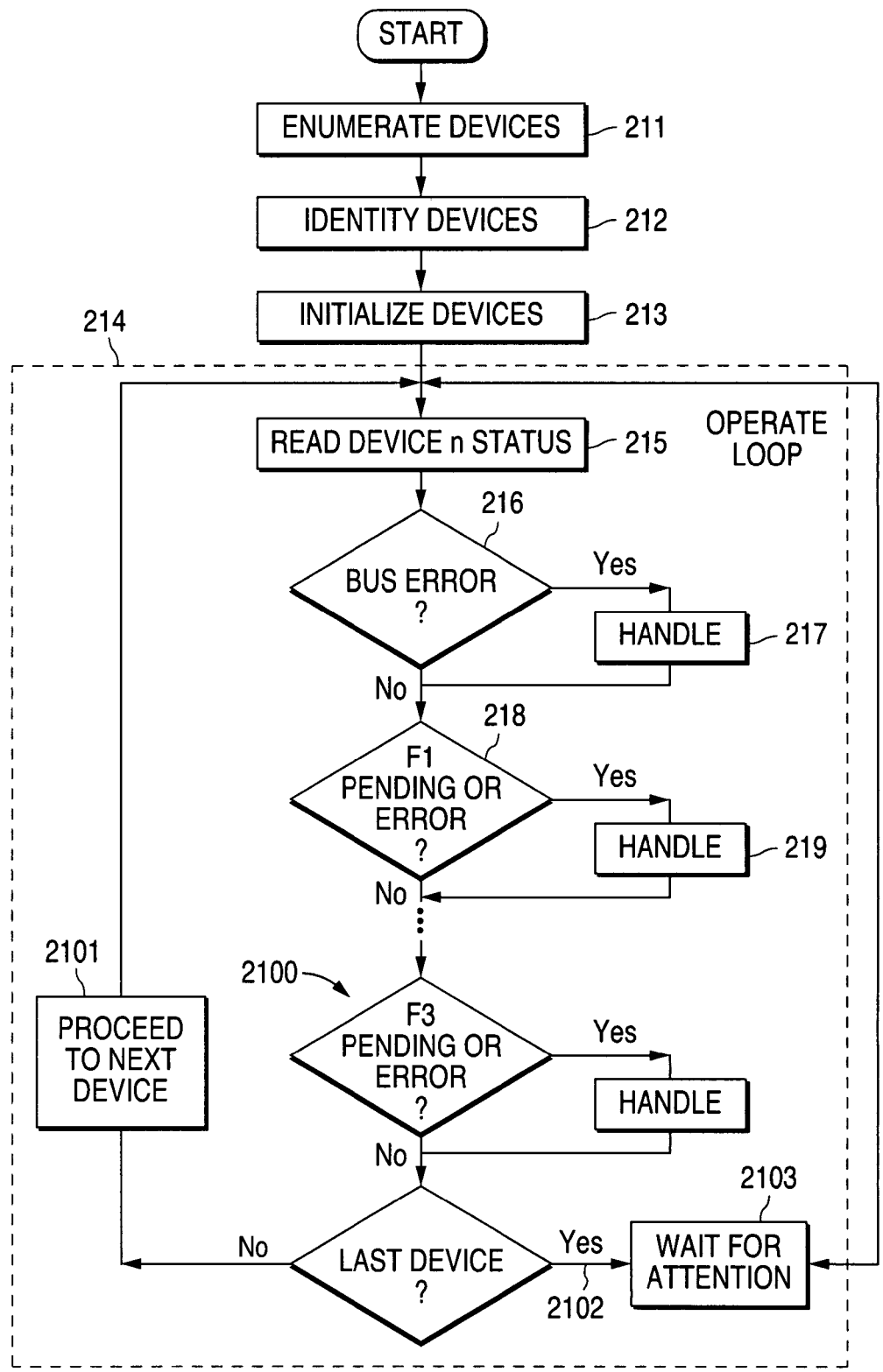
FIG. 21 illustrates a flow chart of the operational sequence of a master, in accordance with an embodiment of the invention.

The procedure is repeated for other functions (of which function #3 2100 is shown in FIG. 21).

Next, move to the next device 2101 until all device status registers were read without an attention 2102. Now await to an attention request 2103 to repeat the operate loop procedure 214.

Note that attention request causes a scan of all devices after it was received, but does not call for a re-start of the scan.

Now, depending on whether the SEF bit is set (bit '0' of the data readout register 170), data from other active sensors is read, using substantially the same procedure as discussed above.

This procedure continues until all data from all sensors, in respect of all the functions and for all slave devices is read.

The invention is of course not bound by this exemplary scenario. Bt way of another non limiting example, the slave devices scan operation (described above) is modified in the sense that multiple results are read from a function before proceeding to the next function and next device. In addition, every write operation completion is verified to guarantee error free operation (otherwise the recovery from an error may be more complex, even though more efficient in performance).

Note also that additional operations of the master, not shown in FIG. 21, are for example, related to setting the system to low power mode, e.g., in response to such request as part of a system level power state change. Also not shown are e.g. activities taken by the master in response to handling of the data read from the slave devices.

Note also that for every slave device, the data from all the sensors in respect of all the available functions is read from the common readout register (constituting an exemplary common interface), thereby simplifying the interface between the master and slave, avoiding the need to use distinct addresses for each sensor in order to read data that originate from different sensors. The slave in its turn operates according to the typical yet not exclusive flow chart depicted in FIG. 22.

Thus, in response to power up or reset, the slave is activated 221, and after master initializes the slave 222 the slave scans the various sensors in a repeatable manner 223. By the specific example discussed above this includes storing sensor read data in the temperature readout field of the temperature measurement readout register 170, setting bit #0 SEF, setting the SF1 bit in the common control register and triggering attention. Similar operations are performed in respect of other active functions.

Those versed in the art will readily appreciate that the invention accordance with the second aspect in not bound by the specific sequences of operation, described with reference to FIG. 22.

Note that irrespective of the aspect of the invention, the master and the slave can reside in the same card, or reside in different parts of the system, communicating through the single wire bus of the invention.

The present invention has been described with certain degree of particularity, but those versed in the art will readily appreciate that various alterations and modifications may be carried out, without departing from the scope of the following claims. It is intended that the present invention encompass such changes and modifications as fall within the scope of the appended claims.

What is claimed is:

1. A master/slave system comprising:
    a single wire bus;
    a master device including a bus interface coupled to the bus;
    multiple slave devices each having a bus interface coupled to the bus; and
    a communication protocol implemented over the single wire bus and employed by the master device and the slave devices; the protocol includes bus transactions comprising bit signals; each bit signal belongs to a bit signal type from among a plurality of bit signal types; and each bit signal type has a time interval that is discernible from time intervals of all other bit signal types;
    wherein the bit signal types include:
    an attention request from at least one of the slave devices that causes the master device to query all of the slave devices, the attention request comprising driving the single wire bus to a specified level once for a first period of time, the first period of time longer than periods of time associated with driving the single wire bus to represent logical "1" and logical "0" data bits,
    a reset signal from at least one of the slave devices when the slave device is powered up, the reset signal comprising driving the single wire bus to a specified level once for a second period of time, the second period of time longer than the first period of time, and
    a start signal indicating the beginning of a transfer, the start signal comprising driving the single wire bus to a specified level once for a third period of time, the third period of time longer than the periods of time associated with driving the single wire bus to represent logical "1" and logical "0" data bits, the third period of time shorter than the first period of time,
    wherein the attention request, the reset signal, and the start signal each start with a bus inactive signal, wherein a level of the bus inactive signal is higher than each of the attention request, the reset signal, and the start signal.

2. The system according to claim 1, wherein the protocol operates in at least one of:
    an asynchronous mode of operation; and
    a synchronous mode of operation where the master device and the slave devices share a synchronized clock.

3. The system according to claim 1, wherein the bit signal types further comprise: data bit value 0, and data bit value 1.

4. The system according to claim 1, wherein each transaction comprises a field identifying one of: a slave device identification of an addressed slave device, and a broadcast mode.

5. The system according to claim 1, wherein the master device is further configured to supply power to at least one slave device through the single wire bus.

6. The system according to claim 1, wherein each of the bus interfaces comprises an open drain output buffer.

7. The system according to claim 1, wherein each bit signal type is discernible from other bit signal types substantially irrespective of noise superimposed on the bit signals.

8. The system according to claim 1, wherein:
    the communication protocol further includes a Master Slave Operational Interface (MSOI) that includes a repertoire of function properties supported by the master device; and
    the master device communicates with any slave device that supports at least one of the function properties that belong to the repertoire of function properties using the bus transactions.

9. The system according to claim 1, wherein a collision of attention requests from multiple slave devices results in no data loss.

10. The system according to claim 1, wherein:
    the reset signal is also produced by the master device.

11. A method for performing communication over a single wire bus between a master device and multiple slave devices coupled through bus interfaces to the bus, comprising:

using a communication protocol implemented over the single wire bus and employed by the master device and the slave devices to drive bus transactions, the master device driving bus transactions comprising bit signals, each bit signal belonging to a bit signal type from among a plurality of bit signal types, each bit signal type having a time interval discernible from time intervals of other bit signal types;

wherein the bit signal types include an attention request from at least one of the slave devices that causes the master device to query all of the slave devices, the attention request comprising driving the single wire bus to a specified level once for a first period of time, the first period of time longer than periods of time associated with driving the single wire bus to represent logical "1" and logical "0" data bits, a reset signal from at least one of the slave devices when the slave device is powered up, the reset signal comprising driving the single wire bus to a specified level once for a second period of time, the second period of time longer than the first period of time, and a start signal indicating the beginning of a transfer, the start signal comprising driving the single wire bus to a specified level once for a third period of time, the third period of time longer than the periods of time associated with driving the single wire bus to represent logical "1" and logical "0" data bits, the third period of time shorter than the first period of time, wherein the attention request, the reset signal, and the start signal each start with a bus inactive signal, wherein a level of the bus inactive signal is higher than each of the attention request, the reset signal, and the start signal.

12. The method according to claim 11, wherein the protocol operates in at least one of:

an asynchronous mode of operation; and a synchronous mode of operation where the master device and the slave devices share a synchronized clock.

13. The method according to claim 11, wherein the bit signal types further comprise: data bit value 0, and data bit value 1.

14. The method according to claim 11, wherein each transaction comprises a field identifying one of: a slave device identification of an addressed slave device, and a broadcast mode.

15. An apparatus configured to communicate over a single wire bus, comprising:

an interface supporting a communication protocol implemented over the single wire bus and employed to drive bus transactions, the apparatus driving bus transactions comprising bit signals, each bit signal belonging to a bit signal type from among a plurality of bit signal types, each bit signal type having a time interval discernible from time intervals of other bit signal types;

wherein the bit signal types include an attention request from at least one of multiple slave devices that causes a master device to query all of the slave devices, and wherein the apparatus comprises the master device or one of the slave devices; and wherein the attention request comprises driving the single wire bus to a specified level once for a first period of time, the first period of time longer than periods of time associated with driving the single wire bus to represent logical "1" and logical "0" data bits, a reset signal from at least one of the slave devices when the slave device is powered up, the reset signal comprising driving the single wire bus to a specified level once for a second period of time, the second period of time longer than the first period of time, and a start signal indicating the beginning of a transfer, the start signal comprising driving the single wire bus to a specified level once for a third period of time, the third period of time longer than the periods of time associated with driving the single wire bus to represent logical "1" and logical "0" data bits, the third period of time shorter than the first period of time, wherein the attention request, the reset signal, and the start signal each start with a bus inactive signal, wherein a level of the bus inactive signal is higher than each of the attention request, the reset signal, and the start signal.

16. The apparatus according to claim 15, wherein the apparatus comprises the master device and is capable of communicating with the slave devices over the single wire bus.

17. The apparatus according to claim 16, wherein the master device is further configured to supply power to at least one slave device through the single wire bus.

18. The apparatus according to claim 16, wherein the master device and the at least one slave device use a supply rail different than a supply rail of the single wire bus.

19. The apparatus according to claim 16, wherein the protocol operates in at least one of:

an asynchronous mode of operation; and a synchronous mode of operation where the master device and the slave devices share a synchronized clock.

20. The apparatus according to claim 16, wherein each transaction comprises a field identifying one of: a slave device identification of an addressed slave device, and a broadcast mode.

21. The apparatus according to claim 15, wherein the apparatus comprises one of the slave devices and is capable of communicating with the master device over the single wire bus.

22. The apparatus according to claim 15, wherein the single wire bus operates at one of: a first speed and a higher second speed.

23. The apparatus according to claim 15, wherein the bit signal types further comprise: data bit value 0, and data bit value 1.

* * * * *

UNITED STATES PATENT AND TRADEMARK OFFICE
CERTIFICATE OF CORRECTION

| | | |
|---|---|---|
| PATENT NO. | : 7,606,955 B1 | Page 1 of 1 |
| APPLICATION NO. | : 10/931933 | |
| DATED | : October 20, 2009 | |
| INVENTOR(S) | : Falik et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 505 days.

Signed and Sealed this

Twelfth Day of October, 2010

David J. Kappos
*Director of the United States Patent and Trademark Office*